US011856054B2

(12) United States Patent
Cady

(10) Patent No.: US 11,856,054 B2
(45) Date of Patent: *Dec. 26, 2023

(54) QUALITY OF SERVICE (QOS) SETTING RECOMMENDATIONS FOR VOLUMES ACROSS A CLUSTER

(71) Applicant: NetApp, Inc., San Jose, CA (US)

(72) Inventor: Tyler Cady, Denver, CO (US)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,911

(22) Filed: Oct. 4, 2021

(65) Prior Publication Data

US 2022/0030057 A1 Jan. 27, 2022

Related U.S. Application Data

(63) Continuation of application No. 16/842,552, filed on Apr. 7, 2020, now Pat. No. 11,140,219.

(51) Int. Cl.
| | |
|---|---|
| *H04L 67/1012* | (2022.01) |
| *H04L 67/1097* | (2022.01) |
| *H04L 67/61* | (2022.01) |
| *G06F 7/535* | (2006.01) |

(52) U.S. Cl.
CPC .......... *H04L 67/1012* (2013.01); *G06F 7/535* (2013.01); *H04L 67/1097* (2013.01); *H04L 67/61* (2022.05)

(58) Field of Classification Search
None
See application file for complete search history.

(56) References Cited

U.S. PATENT DOCUMENTS

| | | | |
|---|---|---|---|
| 7,181,607 B2 | 2/2007 | Ido et al. | |
| 9,003,021 B2 * | 4/2015 | Wright | G06F 3/0613 709/224 |
| 9,383,269 B2 | 7/2016 | Hammerschmidt | |
| 9,411,834 B2 * | 8/2016 | Hrischuk | G06F 3/061 |
| 9,542,103 B2 * | 1/2017 | Faulkner | G06F 11/3034 |
| 9,542,293 B2 * | 1/2017 | Sprague | G06F 11/3485 |

(Continued)

OTHER PUBLICATIONS

Non Final Office Action dated Nov. 2, 2022, for U.S. Appl. No. 17/237,488, filed Apr. 22, 2021, 5 pages.

(Continued)

*Primary Examiner* — Backhean Tiv
(74) *Attorney, Agent, or Firm* — HAYNES AND BOONE, LLP

(57) ABSTRACT

A system, method, and machine-readable storage medium for providing a quality of service (QoS) recommendation to a client to modify a QoS setting are provided. In some embodiments, a set of volumes of a plurality of volumes may be determined. Each volume of the set of volumes may satisfy a first QoS setting assigned to the volume and a second QoS setting assigned to the volume. The plurality of volumes may reside in a common cluster and may be accessed by the client. Additionally, a subset of the set of volumes may be determined. Each volume of the subset may satisfy an upper bound of a range based on a minimum IOPS setting of the volume. A QoS recommendation to the client to modify the first QoS setting may be transmitted for one or more volumes of the subset.

20 Claims, 10 Drawing Sheets

(56) References Cited

U.S. PATENT DOCUMENTS

| | | | | |
|---|---|---|---|---|
| 9,542,346 | B2* | 1/2017 | Hrischuk | G06F 3/067 |
| 9,547,445 | B2* | 1/2017 | Faulkner | G06F 3/0611 |
| 9,838,269 | B2* | 12/2017 | Wright | H04L 67/535 |
| 9,930,133 | B2* | 3/2018 | Susarla | H04L 67/568 |
| 9,938,269 | B2 | 4/2018 | Geneste et al. | |
| 10,237,201 | B2* | 3/2019 | Kelly | H04L 67/1097 |
| 10,254,970 | B1* | 4/2019 | Martin | G06F 3/061 |
| 10,313,251 | B2* | 6/2019 | Kalman | H04L 41/40 |
| 10,419,580 | B2* | 9/2019 | Foulkes | H04L 47/805 |
| 10,509,739 | B1* | 12/2019 | Gudipati | G06F 9/3851 |
| 10,516,582 | B2* | 12/2019 | Wright | H04L 41/50 |
| 10,866,768 | B2* | 12/2020 | Breternitz, Jr. | G06F 3/0683 |
| 10,951,488 | B2* | 3/2021 | Wright | G06F 11/3433 |
| 10,997,098 | B2* | 5/2021 | Longo | G06F 13/1689 |
| 11,005,924 | B1* | 5/2021 | Cady | H04L 67/1012 |
| 11,140,219 | B1* | 10/2021 | Cady | G06F 7/535 |
| 2007/0047527 | A1* | 3/2007 | Croak | H04L 47/70 370/356 |
| 2007/0064604 | A1 | 3/2007 | Chen et al. | |
| 2007/0083482 | A1 | 4/2007 | Rathi et al. | |
| 2009/0287898 | A1 | 11/2009 | Hara | |
| 2010/0046369 | A1 | 2/2010 | Zhao et al. | |
| 2013/0212349 | A1* | 8/2013 | Maruyama | G06F 11/3452 711/167 |
| 2013/0223216 | A1* | 8/2013 | Greene | G06F 9/5083 370/230.1 |
| 2013/0227111 | A1* | 8/2013 | Wright | G06F 11/3495 709/223 |
| 2013/0227145 | A1* | 8/2013 | Wright | H04L 67/1029 709/226 |
| 2013/0232261 | A1* | 9/2013 | Wright | G06F 3/061 709/224 |
| 2013/0279326 | A1* | 10/2013 | Dunne | H04L 41/147 370/228 |
| 2014/0223014 | A1 | 8/2014 | Bairavasundaram et al. | |
| 2014/0344810 | A1* | 11/2014 | Wang | G06F 9/5072 718/1 |
| 2015/0201017 | A1 | 7/2015 | Hrischuk et al. | |
| 2015/0277767 | A1 | 10/2015 | Hamano et al. | |
| 2015/0324232 | A1* | 11/2015 | Wang | G06F 9/5072 718/1 |
| 2016/0119443 | A1* | 4/2016 | Susarla | H04L 67/1097 709/213 |
| 2016/0197794 | A1* | 7/2016 | Wang | H04L 41/5058 709/223 |
| 2017/0053011 | A1 | 2/2017 | Alatorre et al. | |
| 2017/0132085 | A1 | 5/2017 | Wang et al. | |
| 2017/0317895 | A1* | 11/2017 | Wright | H04L 41/5009 |
| 2018/0004452 | A1* | 1/2018 | Ganguli | G06F 11/3034 |
| 2018/0081832 | A1 | 3/2018 | Longo et al. | |
| 2018/0097707 | A1* | 4/2018 | Wright | H04L 67/61 |
| 2019/0235777 | A1 | 8/2019 | Wang et al. | |
| 2020/0127900 | A1* | 4/2020 | Wright | G06F 11/3485 |
| 2021/0160155 | A1 | 5/2021 | Wright et al. | |
| 2022/0030057 | A1* | 1/2022 | Cady | G06F 7/535 |
| 2022/0342558 | A1 | 10/2022 | Longo et al. | |

OTHER PUBLICATIONS

Baker R., "SolidFire, vVols, and QoS Noisy Neighbor Issues," Baker's Cloudy World, 2019, 17 pages. URL: https://ryanbaker.io/2019-09-03-solidfire-and-vvols/.

Bigelow S.J., "Definition Microsoft Storage QoS (Storage Quality of Service)," TechTarget Network, 2022, 5 pages. URL: https://www.techtarget.com/searchwindowsserver/definition/Microsoft-Storage-QoS-Storage-Quality-of-Service#:~:text=Microsoft%20Storage%20QoS%20(Storage%20Quality%20of%20Service)%20is%20a%20feature,Cluster%20Shared%20Volumes%20(CSV).

Crump G., "What Is Storage QoS?," Network Computing, 2014, 6 pages. URL: https://www.networkcomputing.com/data-centers/what-storage-qos.

NetApp., "Guarantee throughput with QoS," ONTAP 9, 2022, pp. 1-17. URL: https://docs.netapp.com/US-en/ontap/performance-admin/guarantee-throughput-qos-task.html.

NetApp., "ONTAP 9 Documentation," ONTAP 9, 2022, pp. 1-2905. URL: https://docs.netapp.com/US-en/ontap/index.html.

NetApp., "Storage QoS," Data ONTAP 8.2, 2014, 1 page. URL: https://library.netapp.com/ecmdocs/ECMP1552961/html/GUID-868E65B9-B84D-4191-A69D-17F0E0D8914C.html.

NetApp., "What is Adaptive QoS and how does it work?," 2022, pp. 1-5. URL: https://kb.netapp.com/Advice_and_Troubleshooting/Data_Storage_Software/ONTAP_OS/What_is_Adaptive_QoS_and_how_does_it_work.

NetApp., "Concept of HCI Performance," NetApp HCI Documentation, 2022, pp. 1, URL: https://docs.netapp.com/us-en/hci/docs/concept_hci_performance.html.

Sammer, "NetApp SolidFire Quality of Service (QOS)", Technical Report, Oct. 2017, 20 pages, NetApp, Inc. URL: https://www.netapp.com/pdf.html?item=/media/10502-tr-4644.pdf.

Notice of Allowance dated Apr. 17, 2023 for U.S. Appl. No. 17/301,852, filed Apr. 15, 2021, 7 pages.

* cited by examiner

QUALITY OF SERVICE (QOS) SETTING RECOMMENDATIONS FOR VOLUMES ACROSS A CLUSTER

CROSS-REFERENCE TO RELATED APPLICATIONS

The present application is a continuation of U.S. patent application Ser. No. 16/842,552, filed Apr. 7, 2020, which is incorporated herein by reference in its entirety.

TECHNICAL FIELD

The present description relates to data storage systems, and more specifically, to a system, method, and machine-readable storage medium for improving quality of service (QoS) settings in a distributed storage system for improved efficiency and user experience.

BACKGROUND

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

One way of attempting to provide a better client experience is by allowing clients to set a quality of service (QoS) that guarantees a particular level of performance for volumes. For example, QoS may guarantee a particular level of performance by provisioning minimum, maximum, and/or burst levels of input/output operations per second (IOPS) to volumes. The minimum IOPS setting for a volume may refer to a guaranteed number of IOPS at which the volume will perform, assuming that the cluster in which the volume resides is not over-provisioned. The maximum IOPS value for a volume may refer to the number of IOPS at which the volume will be throttled. The burst IOPS value for a volume may be the number of IOPS that a volume will be able to perform at beyond the maximum IOPS value setting for a short amount of time based upon burst IOPS credits. Burst IOPS credits may be accrued when the volume has been performing at fewer than the maximum IOPS value for an extended amount of time. For example, a volume may accrue burst IOPS credits while the volume performs under the maximum IOPS value (e.g., to a maximum number of credits), and the volume may spend or use burst IOPS credits while the volume performs above the maximum IOPS value.

Provisioning IOPS to volumes may be highly dynamic and complex, especially across many volumes or slice services. A client may set the QoS IOPS settings for a volume. QoS settings may be complex and difficult for clients to understand. For example, the client may over-provision or under-provision the minimum IOPS setting, maximum IOPS setting, or burst IOPS setting of one or more volumes. Accordingly, the client may suboptimally set the QoS settings in such a way that the client experiences poor performance and high latency from the system, without awareness of the QoS settings.

BRIEF DESCRIPTION OF THE DRAWINGS

The present disclosure is best understood from the following detailed description when read with the accompanying figures.

DETAILED DESCRIPTION

Figure 1:
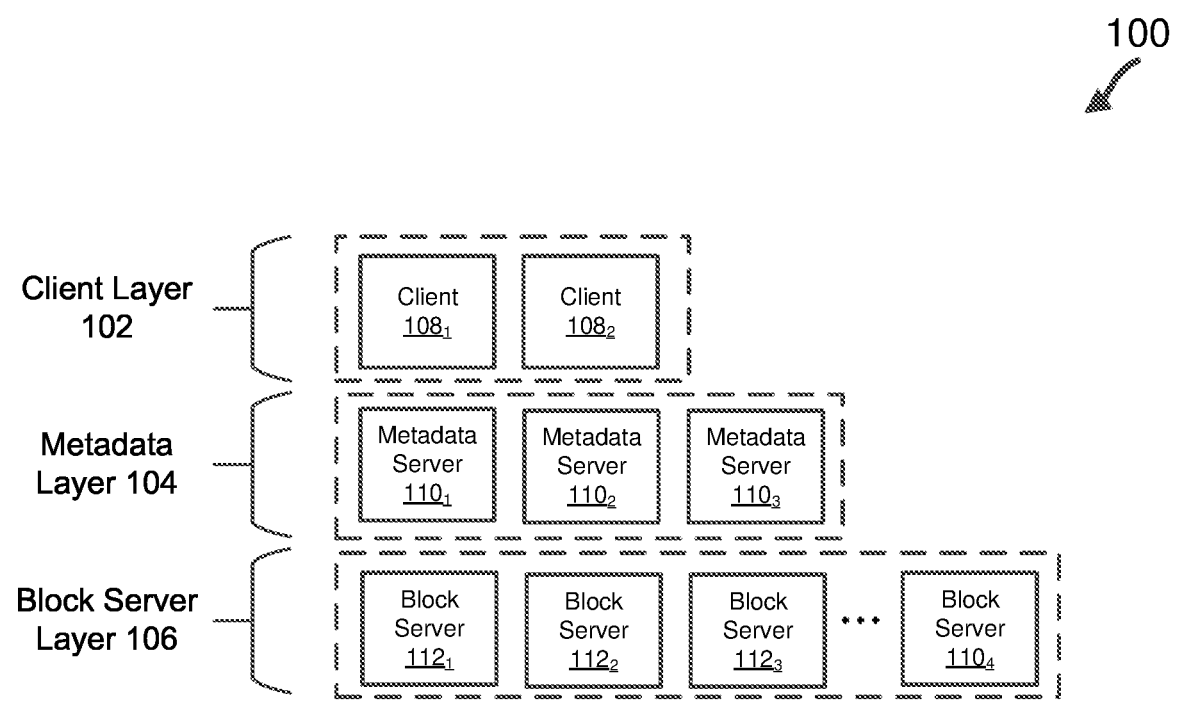
FIG. 1 illustrates a system for a distributed data storage system according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

A distributed storage system may include one or more storage nodes, and each storage node may include one or more slice services. Each slice service may include one or more volumes, and a client may store data to multiple volumes, retrieve data from multiple volumes, and/or modify data stored on multiple volumes. The distributed storage system may provide a quality of service (QoS) that guarantees a level of performance by provisioning one or more of QoS metrics. A QoS metric may be, for example, a minimum input/output operations per second (IOPS) assigned to a volume, a maximum IOPS value assigned to the volume, and/or a burst IOPS value assigned to the volume. The minimum IOPS setting for a volume may refer to a guaranteed number of IOPS at which the volume will perform. The maximum IOPS setting for a volume may refer to the number of IOPS at which the volume will be throttled. The burst IOPS setting for a volume may be the number of IOPS that a volume will be able to perform at beyond the maximum IOPS value setting for a short amount of time based upon burst IOPS credits. Other QoS metrics may be, for example, bandwidth and/or latency. One QoS metric or a combination of QoS metrics may be provisioned for a client.

Provisioning IOPS to volumes, however, may be highly dynamic and complex, especially across many volumes or slice services. For example, access to a volume by a client may change frequently. Accordingly, the client may repeatedly need to pay attention and provision IOPS to volumes frequently. Additionally, the level of complexity may be difficult to understand for many clients. Accordingly, clients may consistently misconfigure their QoS settings (e.g., by over-provisioning or under-provisioning their minimum levels of IOPS). For example, if a client disproportionately allocates the minimum IOPS settings, maximum IOPS settings, and/or the burst IOPS settings of a plurality of volumes accessed by the client, load balancing issues may arise if the allocation does not accurately reflect the desired performance. In some examples, the load on the volumes may be unbalanced and the user may detect poor performance from the system due to latency. Such QoS settings may occur because, for example, the client may be inexperienced in assigning QoS settings to volumes, may be inexperienced in knowing or unaware of the workload of volumes, and the like. Such misconfiguration may lead to suboptimal utilization of the QoS feature and may degrade volume and overall slice service performance.

A slice service balancer may balance volumes on slice services across storage nodes based on, for example, the minimum IOPS settings, the maximum IOPS settings, and/or the burst IOPS settings of the volumes. The slice service balancer may inject latency on I/O operations to keep volumes within their allocated QoS domains. Throttle is the pushback on all volumes on a slice service, and the slice service balancer may enforce QoS by throttling one or more volumes. Throttling a volume acts by restricting the number of IOPS that the volume is allowed to perform, for each sample period (e.g., every 500 milliseconds).

In some examples, the minimum IOPS setting of a volume may be set too high or too low for the volume's workloads. For example, if the minimum IOPS setting of a volume is set too high (e.g., the volume rarely processes enough IOPS operations to reach the minimum IOPS setting), then too much I/O may be allocated from other volumes to a volume that does not need it. In this example, it may be desirable to decrease the minimum IOPS setting of the volume. Reference to a workload exceeding a QoS setting (e.g., minimum, maximum, and/or burst IOPS setting) may refer to a volume processing the workload exceeding the QoS setting. In another example, if the minimum IOPS setting of a volume is set too low (e.g., the volume typically processes more IOPS operations than the minimum IOPS setting), then it may be desirable to increase the minimum IOPS setting of the volume to guarantee workloads running on the volume a greater number of IOPS.

In some examples, the maximum IOPS setting of a volume may be set too high or too low for the volume's processing workloads. For example, if the maximum IOPS setting of a volume is set too high (e.g., the volume rarely processes enough IOPS operations to reach the maximum IOPS setting), then too much I/O may be allocated from other volumes to a volume that does not need it. In this example, it may be desirable to decrease the maximum IOPS setting of the volume. In another example, if the maximum IOPS setting of a volume is set too low (e.g., the volume is typically asked to process more IOPS operations than the maximum IOPS setting), then the volume may be throttled along with the volumes on that volume's slice service, resulting in degradation of performance for the entire slice service. In this example, it may be desirable to increase the maximum IOPS setting of the volume.

In some examples, some QoS settings may be set too close together, resulting in performance degradation. For example, if the cluster becomes bound by I/O capacity, the volumes may be scaled back from their maximum IOPS level proportionally toward their minimum IOPS values to ensure fair resource allocation when the system is heavily loaded. If the minimum and maximum IOPS settings are too close (e.g., within a threshold), then the system may be unable to ensure fair resource allocation when it is heavily loaded. In this example, it may be desirable to raise the burst IOPS setting of the volume such that the volume is able to process more IOPS during a spike in demand. In another example, if the maximum and burst IOPS settings are too close, the volume may be unable to effectively process IOPS during a spike in demand. In this example, it also may be desirable to raise the burst IOPS setting of the volume such that the volume is able to process more IOPS during a spike in demand. Accordingly, if a client disproportionately allocates the minimum IOPS settings, maximum IOPS settings, and/or the burst IOPS settings of a plurality of volumes accessed by the client, load balancing issues may arise if the allocation does not accurately reflect the desired performance The present application describes a QoS module for providing a client with a QoS recommendation to modify (e.g., increase or decrease) the minimum IOPS settings, the maximum IOPS setting, and/or the burst IOPS setting of one or more volumes in a common cluster. In some examples, the QoS module may provide recommended minimum IOPS settings, recommended maximum IOPS setting, and/or recommended burst IOPS setting for the one or more volumes. In an example, users may opt into allowing the QoS module to automatically modify the QoS settings (e.g., minimum IOPS setting, maximum IOPS setting, and/or burst IOPS setting) of the one or more volumes. In another example, the QoS module may provide the recommended QoS setting to the user, and the user may approve of or reject the modification. If the user approves of the modification, the QoS minimum module may replace a current QoS setting of a volume with the recommended QoS setting of the one or more applicable volumes. If the user rejects the modification, the QoS module does not modify the QoS setting of the one or more applicable volumes.

Based on the QoS recommendations, users may have better insight into how QoS settings of volumes affect their workload, improving the user's experience and understanding of the system. Additionally, by modifying the QoS settings of recommended volumes, throttling of volumes may be reduced and accordingly, the computer system and network may run more efficiently and further improve the user's experience.

FIG. 1 illustrates a system 100 for a distributed data storage system according to one or more aspects of the present disclosure. The system 100 includes a client layer 102, a metadata layer 104, and a block server layer 106. The client layer 102 includes clients $108_1$ and $108_2$ in the illustrated example. The metadata layer 104 includes metadata servers $110_1$, $110_2$, and $110_3$ in the illustrated example. The block server layer 106 includes block servers $112_1$, $112_2$, $112_3$, and $112_4$ in the illustrated example. Although the client layer 102 is shown as including two clients 108, the metadata layer 104 is shown as including three metadata servers 110, and the block server layer 106 is shown as including four block servers 112, these examples are not intended to be limiting and in other examples, the client layer 102, the metadata layer 104, and the block server layer 106 may include any number (one or more) of clients 108, metadata servers 110, and block servers 112, respectively.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. When operating across multiple machines, the machines may communicate using a network interface, such as a local area network (LAN) or a wide area network (WAN). In some embodiments, one or more metadata servers 110 may be combined with one or more block servers 112 in a single machine. Entities in the system 100 may be virtualized entities. For example, multiple virtual block servers 112 may be included on a machine. Entities may also be included in a cluster, where computing resources of the cluster are virtualized such that the computing resources appear as a single entity.

The clients 108 include client processes that may exist on one or more physical machines. When the term "client 108" is used in the present disclosure, the action being performed may be performed by a client process. A client process is responsible for storing, retrieving, and/or deleting data in the system 100. A client process may address pieces of data depending on the nature of the storage system and the format of the data stored. For example, the client process may reference data using a client address, which may take different forms. For example, in a storage system that uses file storage, the client 108 may reference a particular volume or partition, and a file name. For object storage, the client address may be a unique object name. For block storage, the client address may be a volume or partition, and a block address. The clients 108 may communicate with the metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

The block servers 112 store data for clients 108. In some embodiments, data may be broken up into one or more storage units. A storage unit may also be referred to as a data block. Data may be segmented into data blocks. Data blocks may be of a fixed size, may be initially a fixed size but compressed, or may be of a variable size. Data blocks may also be segmented based on the contextual content of the block. For example, data of a particular type may have a larger data block size compared to other types of data. Maintaining segmentation of the blocks on a write (and corresponding re-assembly on a read) may occur in the client layer 102 and/or the metadata layer 104. Also, compression may occur in the client layer 102, the metadata layer 104, and/or the block server layer 106.

In some examples, data may be stored in a volume that is referenced by the client 108. A volume may be made up of one or more volume slices. The data associated with the volume includes a list of volume slices for that volume. A volume slice is a list of blocks for a portion of a volume. A block is the raw data for a volume and may be the smallest addressable unit of data.

The block servers 112 may store data on a storage medium. The storage medium may include different medium formats. For example, electromechanical disk storage or a solid state storage drive may be used. Electromechanical disk storage may include spinning disks that use movable read/write heads to read/write to/from different locations of the spinning disks. Inserting the read/write head at various random locations results in slower data access than if data is read from a sequential location. A solid state storage drive uses a solid state memory to store persistent data. Solid state drives may use microchips that store data in non-volatile memory chips and may contain no moving parts. Solid state drives may also perform random access and parallel reads/writes efficiently.

Data from the clients may be stored non-sequentially. In various implementations, non-sequentially storing data in storage is based upon breaking data up into one more data blocks. In addition to storing data non-sequentially, data blocks can be stored to achieve substantially even distribution across the storage system. In various examples, even distribution can be based upon a unique block identifier. For example, the data blocks may be stored in the block server layer 106 based on unique block identifiers.

A block identifier can be an identifier that is determined based on the content of the data block, such as by a hash of the content (e.g., a cryptographic hash function (e.g., Skein algorithm) that generates a hash value identified herein as the "block identifier"). The block identifier is unique to that block of data. For example, blocks with the same content have the same block identifier, but blocks with different content have different block identifiers. The values of possible unique identifiers can have a uniform distribution. The bin assignments may be stored in a distributed key-value store across a cluster (e.g., a cluster 202 in FIG. 2) (e.g., in a so-called "zookeeper" database as just one example). Accordingly, storing data blocks based upon the unique identifier, or a portion of the unique identifier, results in the data being stored substantially evenly across drives in the cluster. Because client data, e.g., a volume associated with the client, is spread evenly across all of the drives in the cluster, every drive in the cluster may be involved in the read and write paths of each volume. This configuration may balance the data and load across all of the drives. Such an arrangement may remove hot spots within the cluster, which can occur when the client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Because clients have their data spread substantially evenly through all the drives in the storage system, a performance of the system can be described in aggregate as a single number, e.g., the sum of performance of all the drives in the storage system.

The block servers 112 maintain a mapping between a block identifier and the location of the data block in a storage medium of block server 112. Data blocks with the same block identifiers are not stored multiple times on a block server 112 when received in multiple client write requests.

The metadata layer 104 may store metadata that maps between the client layer 102 and the block server layer 106. For example, metadata servers 110 may map between the client addressing used by the clients 108 (e.g., file names, object names, block numbers, etc.) and block layer addressing (e.g., block identifiers) used in the block server layer 106. The clients 108 may perform access based on client addresses, and block servers 112 may store data based on unique block identifiers for the data.

Figure 2:
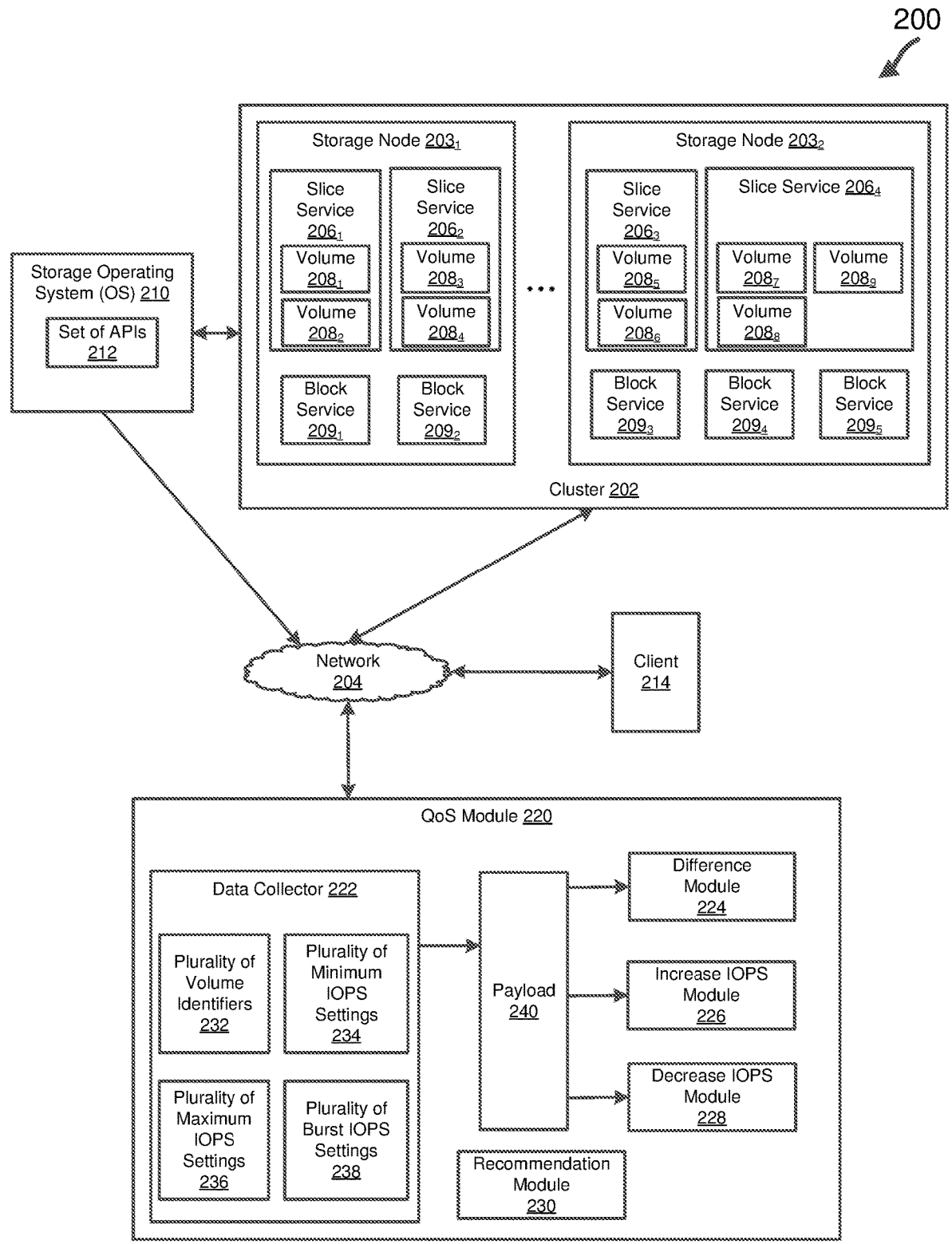
FIG. 2 illustrates a system including a cluster of storage nodes coupled to a quality of service (QoS) module according to one or more aspects of the present disclosure.

FIG. 2 illustrates a system 200 including a cluster 202 of storage nodes 203 coupled to a quality of service (QoS) module 220 according to one or more aspects of the present disclosure. The cluster 202 includes a plurality of storage nodes 203, and each storage node 203 may include one or more slice services 206 as well as one or more block services 209. One or more volumes 208 may be maintained by a slice service 206.

A client 214 may correspond to the client 108, the slice services 206 may correspond to the metadata server 110, and the block service 209 may correspond to the block server 112 illustrated in FIG. 1. The client 214 may store data to, retrieve data from, and/or modify data stored at the cluster 202. Each client 214 may be associated with a volume. In some examples, only one client 214 accesses data in a volume. In some examples, multiple clients 214 may access data in a single volume. The slice services and/or the client 214 may break data into data blocks, such as discussed above with respect to FIG. 1. Block services 209 and slice services 206 may maintain mappings between the client's address and the eventual physical location of the data block in respective storage media of one or more storage nodes 106. A volume includes these unique and uniformly random identifiers, and so a volume's data is also evenly distributed throughout the cluster.

The slice services 206 may store metadata that maps between clients 214 and block services 209. For example, slice services 206 may map between the client addressing used by clients 214 (e.g., file names, object names, block numbers, etc. such as LBAs) and block layer addressing (e.g., block identifiers) used in block services 209. Further, block services 209 may map between the block layer addressing (e.g., block identifiers) and the physical location of the data block on one or more storage devices. The blocks may be organized within bins maintained by the block services 209 for storage on physical storage devices (e.g., SSDs). A bin may be derived from the block ID for storage of a corresponding data block by extracting a predefined number of bits from the block identifiers introduced above.

In some embodiments, the bin may be divided into buckets or "sublists" by extending the predefined number of bits extracted from the block identifier. A bin identifier may be used to identify a bin within the system. The bin identifier may also be used to identify a particular block service 209 (e.g., block service $209_1$-$209_5$ in the example of FIG. 2) and associated storage device (e.g., SSD). A sublist identifier may identify a sublist with the bin, which may be used to facilitate network transfer (or syncing) of data among block services in the event of a failure or crash of a storage node. Accordingly, a client can access data using a client address, which is eventually translated into the corresponding unique identifiers that reference the client's data at the storage node 203.

For each volume hosted by a slice service 206, a list of block identifiers may be stored with one block identifier for each logical block on the volume. Each volume may be replicated between one or more slice services 206 and/or storage nodes 203, and the slice services for each volume may be synchronized between each of the slice services hosting that volume. Accordingly, failover protection is provided in case a slice service 206 fails, such that access to each volume may continue during the failure condition.

The above structure allows storing of data evenly across the cluster of storage devices (e.g., SSDs), which allows for performance metrics to manage load in the system 100, 200. For example, if the system 100, 200 is under a load, clients can be throttled or locked out of a volume. When a client is locked out of a volume, a slice service 206 or volume 208 may close the command window or reduce to zero the amount of read or write data that is being processed at a time for the client 214. The slice service 206 or the volume 208 can queue access requests for the client 214, such that I/O requests from the client 214 can be processed after the client's access to the volume resumes after the lock out period.

Although parts of the system 200 are shown as being logically separate, entities may be combined in different ways. For example, functions discussed in the present disclosure may be combined into a single process or single machine (e.g., a computing device) and multiple functions or all functions may exist on one machine or across multiple machines. Additionally, when operating across multiple machines, the machines may communicate using a network interface, such as a local area network (LAN) or a wide area network (WAN). In some implementations, slice services 206 may be combined with one or more block services 209 in a single machine. Additionally or alternatively, entities in system 200 may be virtualized entities. Entities may also be included in the cluster 202, where computing resources of the cluster are virtualized such that the computing resources appear as a single entity.

The QoS module 220 may govern and/or guarantee levels of performance (e.g., IOPS, bandwidth, etc.) for volumes residing in the cluster 202. In the example illustrated in FIG. 2, the cluster 202 may include storage node $203_1$ including a slice service $206_1$ and a slice service $206_2$, with the slice service $206_1$ including volumes $208_1$ and $208_2$ and the slice service $206_2$ including volumes $208_3$ and $208_4$. The cluster 202 may also include storage node $203_2$ including a slice service $206_3$ and a slice service $206_4$, with the slice service $206_3$ including volumes $208_5$ and $208_6$ and the slice service $206_4$ including volumes $208_7$, $208_8$, and $208_9$. These are merely examples, and it should be understood that a storage node 203 may include any number of slice services (e.g., one or more slice services), and a slice service may include any number of volumes (e.g., one or more volumes).

A user (e.g., an administrator and/or a client) may set the client QoS settings of a volume for a client. Client QoS settings are variables that can be set that define the desired QoS bounds for a client and accordingly can be used to affect how a client uses the storage system. Performance and capacity can be provisioned for volumes independently of each other. In an example, the client 214 may access the volume $208_1$, and the client 214 may set the client QoS settings for the volume $208_1$ to enforce upper and lower bounds on a first QoS metric. Additionally, the client 214 may access the volume $208_7$, and the client 214 may set the client QoS settings for the volume $208_7$ to enforce upper and lower bounds on a second QoS metric different from the first QoS metric.

A QoS metric may be, for example, IOPS, which is a unit of measure of input/output operations per second. The client's QoS IOPS settings for the volume $208_1$ may include, for example, a minimum IOPS setting, a maximum IOPS setting, and/or a burst IOPS setting for the volume. A minimum IOPS setting may also be referred to as a minimum IOPS value, a maximum IOPS setting may also be referred to as a maximum IOPS value, and a burst IOPS setting may also be referred to as a burst IOPS value. The minimum IOPS setting for a volume may refer to a guaranteed number of IOPS at which the volume will perform, assuming that the cluster 202 in which the volume resides is not over-provisioned. The maximum IOPS configuration for each node may vary from node type to node type. An example maximum configuration for a node type may be 85,000 IOPS. In an example, if the sum of the minimum IOPS settings of the volumes across the node exceeds 85,000 (e.g., there are 3 volumes with 30,000 minimum IOPS settings), then the cluster may be said to be over-provisioned with respect to IOPS.

The maximum IOPS value for a volume may refer to the number of IOPS at which the volume will be throttled. The burst IOPS value for a volume may be the number of IOPS that a volume will be able to perform at beyond the maximum IOPS value setting for a short amount of time based upon burst IOPS credits. Burst IOPS credits may be accrued when the volume has been performing at fewer than the maximum IOPS value for an extended amount of time. For example, a volume may accrue one burst IOPS credit for each second the volume performs under the maximum IOPS value, and the volume may spend or use one burst IOPS credit for each second the volume spends performing above the maximum IOPS value. A volume may accrue a maximum number of burst IOPS credits (e.g., sixty burst IOPS credits). Although the application may describe the QoS metric as being in terms of IOPS, it should be understood that embodiments of the disclosure may also apply to other QoS metrics (e.g., bandwidth, latency, etc.).

Each slice service 206 may have a respective storage operating system (OS) 210. Moreover, one of the storage OS 210 may operate as a cluster manager to other slice services 206 within the cluster. Should that slice service 206 with the storage OS 210 operating as the cluster manager fail, another storage OS 210 may assume that role in its place. The storage OS 210 may track QoS settings (e.g., minimum IOPS setting, maximum IOPS setting, and/or burst IOPS setting) per volume, per client.

A client may access multiple volumes, and multiple clients may access the same volume. The same volume may be assigned the same and/or different minimum IOPS settings by different clients. Additionally or alternatively, different volumes may be assigned the same and/or different minimum IOPS settings by the same client. The storage OS 210 may store the usage information per client, per volume into a metadata datastore (which may be within main memory of a storage node 203, for example, or a storage device such as an SSD associated with a slice service 206 as another example.

The storage OS 210 may balance volumes 208 on the slice services 206 across the storage nodes 203 based on their guaranteed QoS settings. For example, the storage OS 210 may inject latency on I/O operations to keep volumes within their allocated QoS domains. Throttle is the pushback on all volumes on a slice service, and the storage OS 210 enforces QoS by throttling one or more volumes. In other words, throttling is the mechanism by which the QoS is enforced. Throttling a volume acts by restricting the number of IOPS that the volume is allowed to perform, for each sample period (e.g., every 500 milliseconds).

In some examples, the storage OS 210 acts as a slice service balancer that balances volumes on slice services based on the minimum IOPS settings, maximum IOPS settings, and/or burst IOPS settings of the volumes. In some examples, the minimum IOPS setting of a volume may be set too high or too low for the volume's workloads. For example, if the minimum IOPS setting of a volume is set too high (e.g., the volume rarely processes enough IOPS operations to reach the minimum IOPS setting), then too much I/O may be allocated from other volumes to a volume that does not need it. In this example, it may be desirable to decrease the minimum IOPS setting of the volume. In another example, if the minimum IOPS setting of a volume is set too low (e.g., the volume typically processes more IOPS operations than the minimum IOPS setting), then it may be desirable to increase the minimum IOPS setting of the volume to guarantee workloads running on the volume a greater number of IOPS.

In some examples, the maximum IOPS setting of a volume may be set too high or too low for the volume's processing workloads. For example, if the maximum IOPS setting of a volume is set too high (e.g., the volume rarely processes enough IOPS operations to reach the maximum IOPS setting), then too much I/O may be allocated from other volumes to a volume that does not need it. In this example, it may be desirable to decrease the maximum IOPS setting of the volume. In another example, if the maximum IOPS setting of a volume is set too low (e.g., the volume typically processes more IOPS operations than the maximum IOPS setting), then the volume may be throttled along with the volumes on that volume's slice service, resulting in degradation of performance for the entire slice service. In this example, it may be desirable to increase the maximum IOPS setting of the volume. Such latency injection may enable predictable and consistent performance across all volumes and may eliminate the "noisy problem," which may occur when a volume's I/O spikes and "takes" I/O from other volumes that reside on the same nodes.

In some examples, some QoS settings may be set too close together, resulting in performance degradation. For example, if the cluster 202 becomes bound by I/O capacity, the storage OS 210 may scale volumes back from their maximum IOPS level proportionally toward their minimum IOPS values to ensure fair resource allocation when the system is heavily loaded. If the minimum and maximum IOPS settings are too close, then the storage OS 210 may be unable to ensure fair resource allocation when the system is heavily loaded. In this example, it may be desirable to raise the burst IOPS setting of the volume such that the volume is able to process more IOPS during a spike in demand. In another example, if the maximum and burst IOPS settings are too close, the volume may be unable to effectively process IOPS during a spike in demand. In this example, it also may be desirable to raise the burst IOPS setting of the volume such that the volume is able to process more IOPS during a spike in demand.

Accordingly, if a client disproportionately allocates the minimum IOPS settings, maximum IOPS settings, and/or the burst IOPS settings of a plurality of volumes accessed by the client, load balancing issues may arise if the allocation does not accurately reflect the desired performance. In any of these examples, the load on the volumes may be unbalanced and the user may detect poor performance from the system due to latency. Such QoS settings may occur because, for example, the client may be inexperienced in assigning QoS settings to volumes, may be inexperienced in knowing or unaware of the workload of volumes, and the like.

A latency service load may refer to a perceived latency for volume I/O on a particular slice service 206, where the latency service load is a number between 0 and 100, inclusive (as just one example). The storage OS 210 may increase the latency service load (e.g., by one) when volumes residing on the slice service 206 are observed to be unable to reach their minimum IOPS value due to latency; otherwise the storage OS 210 decreases the latency service load (e.g., by one). Accordingly, a higher latency service load value may provide for more resources being committed to assist a particular volume for processing a workload, and a lower latency service load value may provide for fewer resources being committed to assist the particular volume.

The storage OS 210 may be included in one or more of the storage nodes 203 (or on another component in FIG. 1 or FIG. 2) or may be separate from the storage nodes 203 and communicate with the storage nodes 203 through a network 204. Although in the example illustrated in FIG. 2, the QoS module 220 is separate from the storage OS 210 and the cluster 202, in other examples one or more components of the QoS module 220 may reside as part of the storage OS 210 and/or as part of the cluster 202.

The QoS module 220 includes a data collector 222, a difference module 224, an increase IOPS module 226, a decrease IOPS module 228, and a recommendation module 232. The storage OS 210 may expose a set of application programming interface (APIs) 212 that when invoked provide information about one or more storage nodes 203 included in the cluster 202. The data collector 222 may invoke one or more APIs of the set of APIs 212 to retrieve QoS information such as the client 214's QoS settings for a particular volume and the volume identifier of the particular volume. A volume identifier may be an identifier that identifies a volume. In response to the data collector 222 invoking one or more APIs of the set of APIs 212, the storage OS 210 may transmit a payload 240 including a plurality of volume identifiers 232, a plurality of minimum IOPS settings 234, a plurality of maximum IOPS settings 236, and/or a plurality of burst IOPS settings 238 to the data collector 222. The client 214 may access a plurality of volumes identified by the plurality of volume identifiers 228 and may assign the plurality of minimum IOPS settings 230, the plurality of maximum IOPS settings 236, and/or the plurality of burst IOPS settings 238 to the plurality of volumes.

In some examples, for each volume of the plurality of volumes for the client 214, the data collector 222 may receive a volume identifier that identifies the respective volume and a QoS setting (e.g., a minimum IOPS setting, a maximum IOPS setting, and/or a burst IOPS setting) assigned to the respective volume. The payload 240 may include JavaScript Object Notation (JSON) data (as an example) storing the applicable information (e.g., the plurality of volume identifier 228 corresponding to the plurality of minimum IOPS settings 230, the plurality of maximum IOPS settings 236, and/or the plurality of burst IOPS settings 238), and the data collector 222 may receive the raw JSON data. JSON data may be written in the form of name-value pairs, where a name-value pair includes a field name and a value of the field. The data collector 222 may parse and process the JSON fields and ensure data integrity (e.g., perform datatype checks, etc.) before transmitting the payload 240 including the plurality of volume identifiers 228 and the plurality of minimum IOPS settings 230, the plurality of maximum IOPS settings 236, and/or the plurality of burst IOPS settings 238 to the difference module 224, the increase IOPS module 226, the decrease IOPS module 228, and/or the recommendation module 230.

In some examples, the minimum and maximum IOPS settings of a volume may be set too close together. In such examples, it may be desirable to increase the burst IOPS setting of the volume to allow the volume to handle sharp spikes in I/O for a short period of time.

Figure 3:
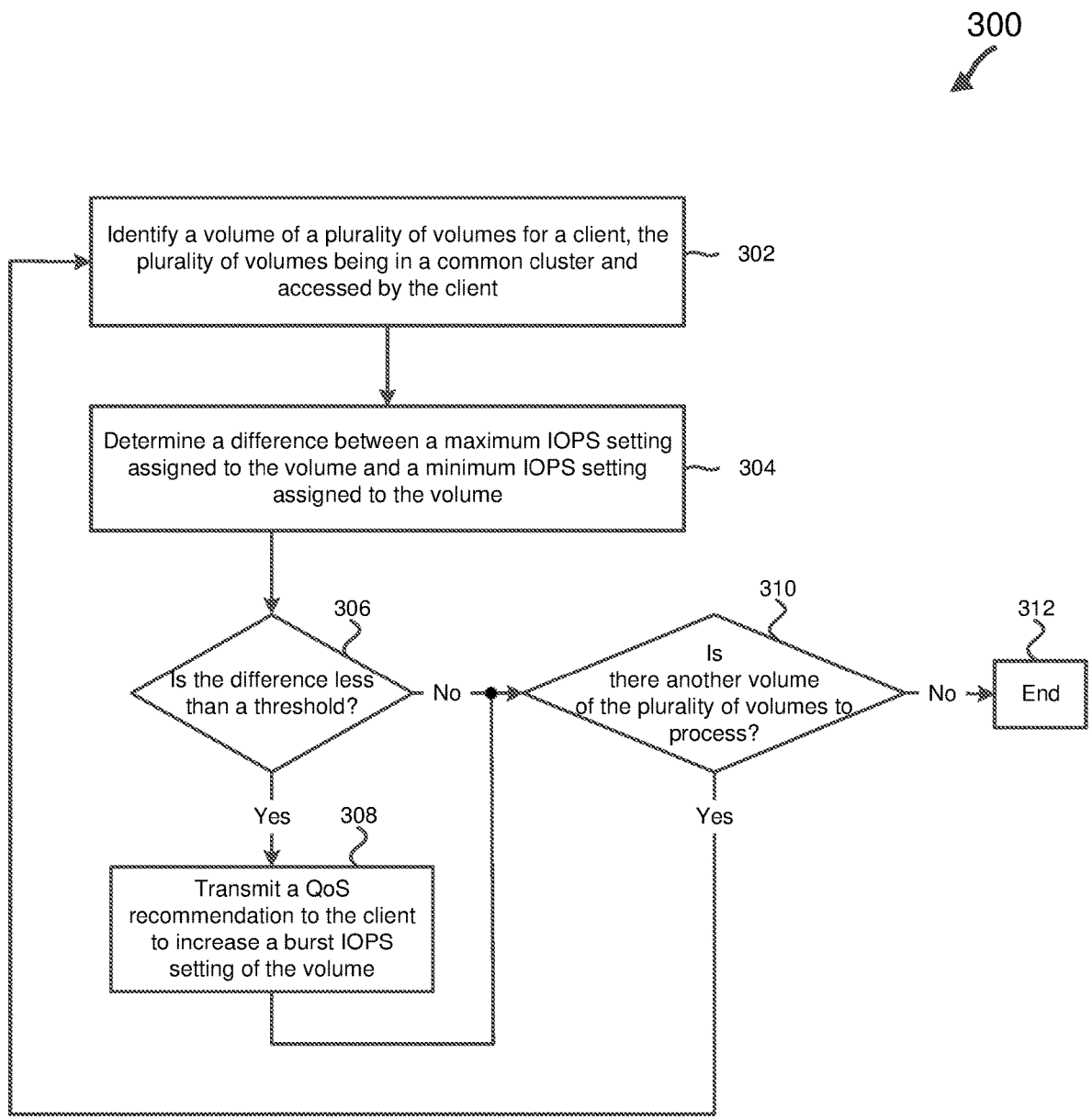
FIG. 3 illustrates a flow diagram of a method of providing a QoS recommendation to increase a burst IOPS setting of a volume based on a minimum IOPS setting and a maximum IOPS setting of the volume according to one or more aspects of the present disclosure.

FIG. 3 illustrates a flow diagram of a method 300 of providing a QoS recommendation to increase a burst IOPS setting of a volume based on a minimum IOPS setting and a maximum IOPS setting of the volume being too closer together, according to one or more aspects of the present disclosure. Blocks of the method 300 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 300. As illustrated, the method 300 includes a number of enumerated blocks, but embodiments of the method 300 may include additional blocks before, after, and in between the enumerated blocks. In some embodiments, one or more of the enumerated blocks may be omitted or performed in a different order.

At block 302, the method 300 includes identifying a volume of a plurality of volumes for a client, the plurality of volumes being in a common cluster and accessed by the client. In an example, the difference module 224 may identify the volume.

At block 304, the method 300 includes determining a difference between a maximum IOPS setting assigned to the volume and a minimum IOPS setting assigned to the volume. In an example, the difference module 224 may determine the difference between the maximum IOPS setting and the minimum IOPS setting of the volume. For each volume used by the client, the client may set the minimum IOPS setting and/or the maximum IOPS setting of the volume. At a later point in time, the client may change the minimum IOPS setting and/or the maximum IOPS setting of the volume. The minimum IOPS value is less than the maximum IOPS and guarantees performance regardless of system condition or application activity. The maximum IOPS setting value may refer to the maximum IOPS that a volume can process over a sustained period of time. The larger the difference, the larger the range between the maximum IOPS setting and the minimum IOPS setting. The smaller the difference, the smaller the range between the maximum IOPS setting and the minimum IOPS setting. If the difference between the maximum IOPS setting and the minimum IOPS setting is too small (e.g., less than a threshold), the system's performance may degrade if, for example, a volume experiences a spike in demand well above the minimum IOPS setting of the volume.

At block 306, the method 300 includes determining whether the difference is less than a threshold. In an example, the threshold is fifty IOPS, and the difference module 224 may determine whether the difference between the maximum IOPS setting and the minimum IOPS setting is less than the threshold of fifty IOPS (as just one example of a numeric value). In another example, the threshold is one hundred IOPS (as just one example of a numeric value), and the difference module 224 may determine whether the difference between the maximum IOPS setting and the minimum IOPS setting is less than the threshold of one hundred IOPS. The difference module 224 may determine that if the difference is less than the threshold, the system (e.g., system 100 in FIG. 1 or system 200 in FIG. 2) is likely to experience performance degradation. To mitigate the performance degradation, it may be desirable to increase a value of the burst IOPS setting of the volume to allow the volume to perform beyond its regular maximum IOPS setting for a longer period of time than would have otherwise been allowed with a non-adjusted burst IOPS setting. Burst IOPS credits may be accrued when the volume has been performing at fewer than the maximum IOPS value for an extended amount of time. For example, a volume may accrue one burst IOPS credit for each second the volume performs under the maximum IOPS value, and the volume may spend or use one burst IOPS credit for each second the volume spends performing above the maximum IOPS value. A volume may accrue a maximum number of burst IOPS credits (e.g., sixty burst IOPS credits).

If the difference between the maximum IOPS setting and the minimum IOPS setting is less than the threshold, the method 300 may proceed to block 308. In this instance, the difference module 224 may determine that the maximum IOPS setting and the minimum IOPS setting are too close together and may result in performance degradation if a QoS setting is not modified. At block 308, the method 300 includes transmitting a QoS recommendation to the client to increase a burst IOPS setting of the volume. In an example, the difference module 224 may trigger transmission of the QoS recommendation in response to determining that the difference is less than the threshold. The recommendation module 230 may transmit the QoS recommendation to the client to increase the burst IOPS setting of the volume. In some examples, the QoS module 220 may receive a request from the client 214 to update the burst IOPS setting of the respective volume in accordance with the QoS recommendation and may perform the update based on the client's request.

In some examples, the QoS module 220 may automatically increase the burst IOPS setting of the volume if the difference is less than the threshold. For example, the QoS module 220 may increase the burst IOPS setting automatically if the adjustment value is within a first threshold, but request approval from a user if the adjustment value is within a second threshold. In an example, the first threshold may be less than the second threshold. The latter change with regard to the second threshold may have a bigger impact on other volumes in the cluster. In another example, the first threshold may be greater than the second threshold.

The QoS recommendation may include a recommendation to the client to restore the default settings of the maximum IOPS setting and/or the minimum IOPS setting of the volume. In some examples, the QoS module 220 may automatically restore the default settings of the minimum IOPS setting and/or the maximum IOPS setting of the volume.

The QoS module 220 may perform additional or alternative actions to determine whether to transmit the QoS recommendation. In some examples, the QoS module 220 may determine whether the respective volume is idle. If the QoS module 220 determines that the volume is idle, then the QoS module 220 may determine to not trigger transmission of the QoS recommendation. In some examples, the QoS module 220 may determine whether the maximum IOPS setting and/or the minimum IOPS setting are intentionally set to their respective values. If the QoS module 220 determines that the maximum IOPS setting and/or the minimum IOPS setting are intentionally set to their respective values, the QoS module 220 may determine to not trigger transmission of the QoS recommendation.

If the difference between the maximum IOPS setting and the minimum IOPS setting is not less than the threshold, the method 300 may proceed from block 306 to block 310. In this instance, the difference module 224 may determine that the maximum IOPS setting and the minimum IOPS setting are far enough apart, potentially resulting in no or less performance degradation based on these QoS settings. At block 310, the method 300 includes determining whether there is another volume of the plurality of volumes to process. If there is another volume of the plurality of volumes to process, the method 300 may proceed back to block 302, during which another volume is processed as discussed relative to FIG. 3. If there is not another volume of the plurality of volumes to process, the method 300 may proceed to block 312. At block 312, the method 300 ends.

The QoS module 220 may execute the method 300 based on various mechanisms. For example, the QoS module 220 may execute the method 300 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 300 for one or more clients. The QoS module 220 may execute any of the methods 400, 500, 600, 700, 800, 900, and/or 1000 in FIGS. 4, 5, 6, 7, 8, 9, and/or 10, respectively, after or during execution of the method 300.

In addition to examples where the minimum and maximum IOPS settings may be too close together, in some other examples the maximum IOPS settings and the burst IOPS setting of a volume may be set too close together. In such examples, it may again be desirable to increase the burst IOPS setting of the volume to allow the volume to handle sharp spikes in I/O for a short period of time.

Figure 4:
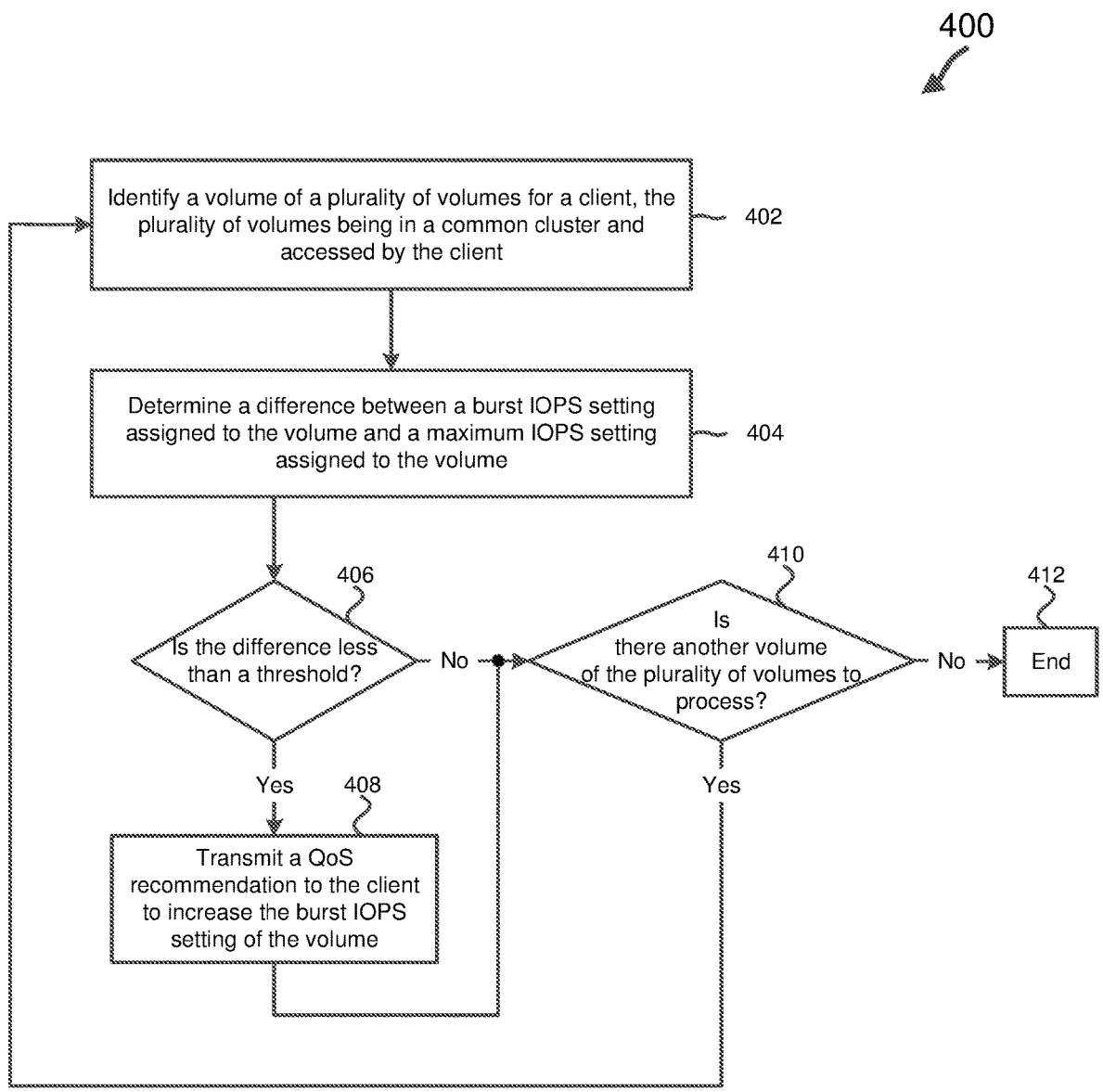
FIG. 4 illustrates a flow diagram of a method of providing a QoS recommendation to increase a burst IOPS setting of a volume based on a maximum IOPS setting and a burst IOPS setting of the volume according to one or more aspects of the present disclosure.

FIG. 4 illustrates a flow diagram of a method 400 of providing a QoS recommendation to increase a burst IOPS setting of a volume based on a maximum IOPS setting and a burst IOPS setting of the volume being too close together, according to one or more aspects of the present disclosure. Blocks of the method 400 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 400. As illustrated, the method 400 includes a number of enumerated blocks, but embodiments of the method 400 may include additional blocks before, after, and in between the enumerated blocks. In some embodiments, one or more of the enumerated blocks may be omitted or performed in a different order.

At block 402, the method 400 includes identifying a volume of a plurality of volumes for a client, the plurality of volumes being in a common cluster and accessed by the client. In an example, the difference module 224 may identify the volume.

At block 404, the method 400 includes determining a difference between a burst IOPS setting assigned to the volume and a maximum IOPS setting assigned to the volume. In an example, the difference module 224 may determine the difference between the burst IOPS setting and the maximum IOPS setting of the volume. For each volume used by the client, the client may set the burst IOPS setting and/or the maximum IOPS setting of the volume. At a later point in time, the client may change the burst IOPS setting and/or the maximum IOPS setting of the volume. If the difference between the burst IOPS setting and the maximum IOPS setting is too small (e.g., less than a threshold), the system's performance may degrade if, for example, a volume experiences a spike in demand well above the maximum IOPS setting of the volume.

At block 406, the method 400 includes determining whether the difference is less than a threshold. In an example, the threshold is fifty IOPS (as just one example of a numeric value), and the difference module 224 may determine whether the difference between the burst IOPS setting and the maximum IOPS setting is less than the threshold of fifty IOPS. In another example, the threshold is one hundred IOPS (as just one example of a numeric value), and the difference module 224 may determine whether the difference between the burst IOPS setting and the maximum IOPS setting is less than the threshold of one hundred IOPS. The difference module 224 may determine that if the difference is less than the threshold, the system (e.g., system 100 in FIG. 1 or system 200 in FIG. 2) is likely to experience performance degradation. To mitigate the performance degradation, it may be desirable to increase a value of the burst IOPS setting of the volume to allow the volume to perform beyond its regular maximum IOPS setting for a longer period of time than would have otherwise been allowed with a non-adjusted burst IOPS setting.

If the difference between the burst IOPS setting and the maximum IOPS setting is less than the threshold, the method 400 may proceed to block 408. In this instance, the difference module 224 may determine that the burst IOPS setting and the maximum IOPS are too close together and may result in performance degradation if the burst IOPS setting is not modified. At block 408, the method 400 includes transmitting a QoS recommendation to the client to increase the burst IOPS setting of the volume. In an example, the difference module 224 may trigger transmission of the QoS recommendation in response to determining that the difference is less than the threshold. The recommendation module 230 may transmit the QoS recommendation to the client to increase the burst IOPS setting of the volume. In some examples, the QoS module 220 may receive a request from the client 214 to update the burst IOPS setting of the respective volume in accordance with the QoS recommendation and may perform the update based on the client's request.

In some examples, the QoS module 220 may automatically increase the burst IOPS setting of the volume if the difference is less than the threshold. For example, the QoS module 220 may increase the burst IOPS setting automatically if the adjustment value is within a first threshold, but request approval from a user if the adjustment value is within a second threshold. In an example, the first threshold may be less than the second threshold. The latter change with regard to the second threshold may have a bigger impact on other volumes in the cluster. In another example, the first threshold may be greater than the second threshold.

The QoS recommendation may include a recommendation to the client to restore the default settings of the burst IOPS setting and/or the maximum IOPS setting of the volume. In some examples, the QoS module 220 may automatically restore the default settings of the burst IOPS setting and/or the maximum IOPS setting of the volume.

The QoS module 220 may perform additional or alternative actions to determine whether to transmit the QoS recommendation. In some examples, the QoS module 220 may determine whether the respective volume is idle. If the QoS module 220 determines that the volume is idle, then the QoS module 220 may determine to not trigger transmission of the QoS recommendation. In some examples, the QoS module 220 may determine whether the burst IOPS setting and/or the maximum IOPS setting are intentionally set to their respective values. If the QoS module 220 determines that the burst IOPS setting and/or the maximum IOPS setting are intentionally set to their respective settings, the QoS module 220 may determine to not trigger transmission of the QoS recommendation.

If the difference between the burst IOPS setting and the maximum IOPS setting is not less than the threshold, the method 400 may proceed from block 406 to block 410. In this instance, the difference module 224 may determine that the burst IOPS setting and the maximum IOPS setting are far enough apart, potentially resulting in no or less performance degradation based on these QoS settings. At block 410, the method 400 includes determining whether there is another volume of the plurality of volumes to process. If there is another volume of the plurality of volumes to process, the method 400 may proceed back to block 402, during which another volume is processed as discussed relative to FIG. 4. If there is not another volume of the plurality of volumes to process, the method 400 may proceed to block 412. At block 412, the method 400 ends.

The QoS module 220 may execute the method 400 based on various mechanisms. For example, the QoS module 220 may execute the method 400 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 400 for one or more clients. The QoS module 220 may execute any of the methods 300, 500, 600, 700, 800, 900, and/or 1000 in FIGS. 3, 5, 6, 7, 8, 9, and/or 10, respectively, after or during execution of the method 400.

In some other examples, the minimum IOPS setting of a volume may be set too high (e.g., the volume rarely processes enough IOPS operations to reach the minimum IOPS setting) for the volume's workloads. If the minimum IOPS setting of a volume is set too high, then too much I/O may be allocated from other volumes to a volume that does not need it. In such examples, it may be desirable to decrease the minimum IOPS setting of the volume.

Figure 5:
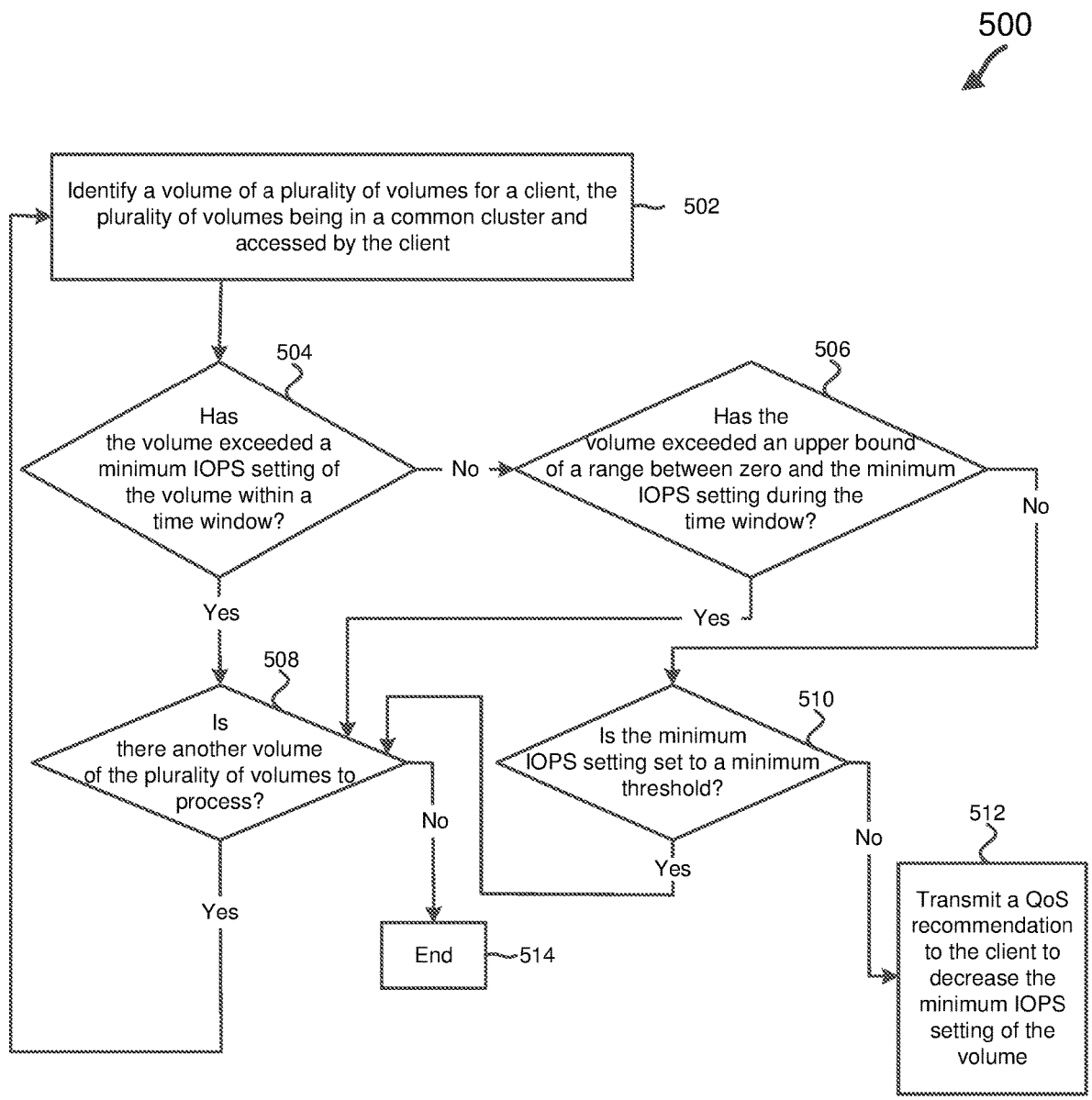
FIG. 5 illustrates a flow diagram of a method of providing a QoS recommendation to decrease a minimum IOPS setting of a volume according to one or more aspects of the present disclosure.

FIG. 5 illustrates a flow diagram of a method 500 of providing a QoS recommendation to decrease a minimum IOPS setting of a volume according to one or more aspects of the present disclosure. Blocks of the method 500 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 500. As illustrated, the method 500 includes a number of enumerated blocks, but embodiments of the method 500 may include additional blocks before, after, and in between the enumerated blocks. In some embodiments, one or more of the enumerated blocks may be omitted or performed in a different order.

At block 502, the method 500 includes identifying a volume of a plurality of volumes for a client, the plurality of volumes being in a common cluster and accessed by the client. In an example, the decrease IOPS module 228 may identify the volume.

At block 504, the method 500 includes determining whether the volume has exceeded a minimum IOPS setting of the volume within a time window. A volume has exceeded the minimum IOPS setting within the time window if any workload processed on the volume has exceeded the minimum IOPS setting within the time window. In an example, the decrease IOPS module 228 may determine whether the volume has exceeded the minimum IOPS setting of the volume within the time window.

In some examples, the decrease IOPS module 228 may receive the payload 240 illustrated in FIG. 2, where the payload 240 may include below-minimum data including QoS metrics that track a number of observations in which the volume is operating at below the minimum IOPS setting of the volume during the time window. For example, if the minimum IOPS setting is set to 1,000 IOPS (as just one example of a numeric value), then the below-minimum data may include a count of the amount of time in which the volume is operating at below 1,000 IOPS within the time window. The decrease IOPS module 228 may determine a below-minimum range that is between zero and the minimum IOPS setting, and the below-minimum range may be further partitioned into subranges, with each below-minimum subrange covering a distribution of values. In an example (for purposes of illustration only), the below-minimum range is partitioned into quintiles, and the decrease IOPS module 228 may determine a first below-minimum subrange including 0 to 199 IOPS (e.g., first quintile), a second below-minimum subrange including 200 to 399 IOPS (e.g., second quintile), a third below-minimum subrange including 400 to 599 IOPS (e.g., third quintile), a fourth below-minimum subrange including 600 to 799 IOPS (e.g., fourth quintile), and a fifth below-minimum subrange including 800 to 999 IOPS (e.g., fifth quintile).

The first below-minimum subrange may include a count of the amount of time in which the volume is operating between 0 and 199 IOPS within the time window. The second below-minimum subrange may include a count of the amount of time in which the volume is operating between 200 and 399 IOPS within the time window. The third below-minimum subrange may include a count of the amount of time in which the volume is operating between 400 and 599 IOPS within the time window. The fourth below-minimum subrange may include a count of the amount of time in which the volume is operating between 600 and 799 IOPS within the time window. The fifth below-minimum subrange may include a count of the amount of time in which the volume is operating between 800 and 999 IOPS within the time window.

The payload 240 may also include minimum-to-maximum data including a number of observations in which the volume is operating at between the minimum IOPS setting and the maximum IOPS setting of the volume during the time window. For example, if the minimum IOPS setting is set to 1,000 IOPS and the maximum IOPS setting is set to 25,000 IOPS (for purposes of illustration only), then the minimum-to-maximum data may include a count of the amount of time in which the volume is operating between 1,000 and 25,000 IOPS within the time window. The decrease IOPS module 228 may determine a minimum-to-maximum range that is between the minimum IOPS setting (e.g., 1,000 IOPS) and the maximum IOPS setting (e.g., 25,000 IOPS), and the minimum-to-maximum may be further partitioned into subranges, with each minimum-to-maximum subrange covering a distribution of values. The minimum-to-maximum range may be further partitioned to determine how effective the minimum and maximum IOPS settings are relative to the volume's workload(s).

In an example, the minimum-to-maximum range is partitioned into quintiles, and the decrease IOPS module 228 may determine a first minimum-to-maximum subrange including 1,000 to 5,799 IOPS (e.g., first quintile), a second minimum-to-maximum subrange including 5,800 to 10,599 IOPS (e.g., second quintile), a third minimum-to-maximum subrange including 10,600 to 15,399 IOPS (e.g., third quintile), a fourth minimum-to-maximum subrange including 15,400 to 20,199 IOPS (e.g., fourth quintile), and a fifth minimum-to-maximum subrange including 20,200 to 25,000 IOPS (e.g., fifth quintile).

The first minimum-to-maximum subrange may include a count of the amount of time in which the volume is operating between 1,000 and 5,799 IOPS within the time window. The second minimum-to-maximum subrange may include a count of the amount of time in which the volume is operating between 5,800 and 10,599 IOPS within the time window. The third minimum-to-maximum subrange may include a count of the amount of time in which the volume is operating between 10,600 and 15,399 IOPS within the time window. The fourth minimum-to-maximum subrange may include a count of the amount of time in which the volume is operating between 15,400 and 20,199 IOPS within the time window. The fifth minimum-to-maximum subrange may include a count of the amount of time in which the volume is operating between 20,200 and 25,000 IOPS within the time window.

If the volume has observations within the first to fifth minimum-to-maximum subranges (i.e. the first to fifth quintiles) during the time window, then the decrease IOPS module 228 may determine that the volume has exceeded the minimum IOPS setting of the volume within the time window. Although the distribution of data may be discussed in relation to quintiles in this example, other examples may have different data distributions (e.g., quartiles, etc.). If the volume has exceeded the minimum IOPS setting of the volume within the time window, then it may be likely that the volume will operate at least at or beyond the minimum IOPS setting. Accordingly, it may be undesirable to decrease the minimum IOPS setting of the volume. In this instance, the method 500 may proceed to block 508.

In contrast, if the volume has not exceeded the minimum IOPS setting of the volume within the time window, then it may be unlikely that the volume will operate at least at or beyond the minimum IOPS setting. Accordingly, it may be likely that the minimum IOPS setting of the volume can be decreased without degrading system performance. In this instance, the method 500 may proceed to block 506.

At block 506, the method 500 includes determining whether the volume has exceeded an upper bound of a range between zero and the minimum IOPS setting during the time window. The decrease IOPS module 228 may determine the upper bound, which may be a number or a percentage of the distribution of below-minimum data. In keeping with the above example in which the below-minimum range is partitioned into quintiles, the upper bound may be 600 IOPS and accordingly include observations in which the volume is operating at 600 to 999 IOPS or may be the fourth quintile of the below-minimum range and accordingly include observations in which the volume is operating at the fourth or fifth quintile of the below-minimum range.

If the volume has exceeded the upper bound of the range between zero and the minimum IOPS setting during the time window, then the volume may be operating closer to the minimum IOPS setting and it may be likely that the volume will operate at least at or beyond the minimum IOPS setting. Accordingly, it may be undesirable to decrease the minimum IOPS setting of the volume. In this instance, the method 500 may proceed to block 508.

In contrast, still with respect to block 506, if the volume has not exceeded the upper bound of the range between zero and the minimum IOPS setting during the time window, then the volume may be operating well below the minimum IOPS setting and it may be desirable to decrease the minimum IOPS setting of the volume. For example, the volume may be operating at least at sixty percent below the minimum IOPS setting of the volume within the time window, and all observations in which the volume is operating below the minimum IOPS setting within the time window falls within the first, second, or third below-minimum subranges. In this example, the decrease IOPS module 228 may determine that the volume is consistently operating at least at sixty percent below the min IOPS setting within the time window. If the volume has not exceeded the upper bound of the range between zero and the minimum IOPS setting during the time window, the method 500 may proceed to block 510.

At block 510, the method 500 includes determining whether the minimum IOPS setting is set to a minimum threshold. In an example, the minimum threshold is fifty IOPS (by way of example), and the decrease IOPS module 228 may determine whether the minimum IOPS setting of the volume is set to fifty IOPS. The minimum threshold may represent the lowest IOPS value that the volume should be set to for the minimum IOPS setting. If the minimum IOPS setting is set at the minimum threshold, it may be undesirable to further decrease the minimum IOPS setting. In this instance, the method 500 may proceed to block 508. In contrast, if the minimum IOPS setting is not set at the minimum threshold, it may be desirable to further decrease the minimum IOPS setting because the volume rarely processes workloads that require the minimum IOPS value. In this instance, the method 500 may proceed back to block 512.

At block 512, the method 500 includes transmitting a QoS recommendation to the client to decrease the minimum IOPS setting of the volume. In an example, the decrease IOPS module 228 may trigger transmission of the QoS recommendation in response to determining that the volume has not exceeded a minimum IOPS setting of the volume within a time window, in response to determining that the volume has not exceeded an upper bound of a range between zero and the minimum IOPS setting during the time window, and/or in response to determining that the minimum IOPS setting is not set to the minimum threshold. In some examples, the QoS module 220 may automatically decrease the minimum IOPS setting of the volume based on these determinations.

The recommendation module 230 may transmit the QoS recommendation to the client to decrease the minimum IOPS setting of the volume. In some examples, the QoS module 220 may receive a request from the client 214 to decrease the minimum IOPS setting of the volume in accordance with the QoS recommendation and may perform the update based on the client's request. In some examples, the QoS recommendation may include a recommendation to the client to restore the default setting of the minimum IOPS setting if the default setting is less than the current minimum IOPS setting of the volume. Additionally or alternatively, the QoS module 220 may automatically restore the default setting of the minimum IOPS setting of the volume if the default setting is less than the current minimum IOPS setting of the volume. In some examples, the QoS recommendation may include a recommendation to the client to set the minimum IOPS setting to the minimum threshold value. Additionally or alternatively, the QoS module 220 may automatically update (e.g., decrease) the minimum IOPS setting of the volume to the minimum threshold value. In some examples, the QoS recommendation may include a recommendation to the client to set the minimum IOPS setting to an IOPS value below the upper bound of the range between zero and the minimum IOPS setting of the volume. Additionally or alternatively, the QoS module 220 may automatically update the minimum IOPS setting of the volume to the IOPS value.

In some examples, the QoS module 220 may automatically decrease the minimum IOPS setting of the volume. For example, the QoS module 220 may decrease the minimum IOPS setting of the volume automatically if the adjustment value is within a first threshold, but request approval from a user if the adjustment value is within a second threshold. In an example, the first threshold may be less than the second threshold. The latter change with regard to the second threshold may have a bigger impact on other volumes in the cluster. In another example, the first threshold may be greater than the second threshold.

Returning to block 508, the method 500 includes determining whether there is another volume of the plurality of volumes to process. If there is another volume of the plurality of volumes to process, the method 500 may proceed back to block 502, during which another volume is processed as discussed relative to FIG. 5. If there is not another volume of the plurality of volumes to process, the method 500 may proceed to block 514. At block 514, the method 500 ends.

The QoS module 220 may execute the method 500 based on various mechanisms. For example, the QoS module 220 may execute the method 500 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 500 for one or more clients. The QoS module 220 may execute any of the methods 300, 400, 600, 700, 800, 900, and/or 1000 in FIGS. 3, 4, 6, 7, 8, 9, and/or 10, respectively, before, after, or during execution of the method 500. Further, all of the values discussed with respect to FIG. 5 are by way of example to illustrate aspects of the present disclosure.

In some other examples, the maximum IOPS setting of a volume may be set too high (e.g., the volume rarely processes IOPS operations close to (or within a threshold of) the maximum IOPS setting) for the volume's workloads. In such examples, it may be desirable to decrease the maximum IOPS setting of the volume.

Figure 6:
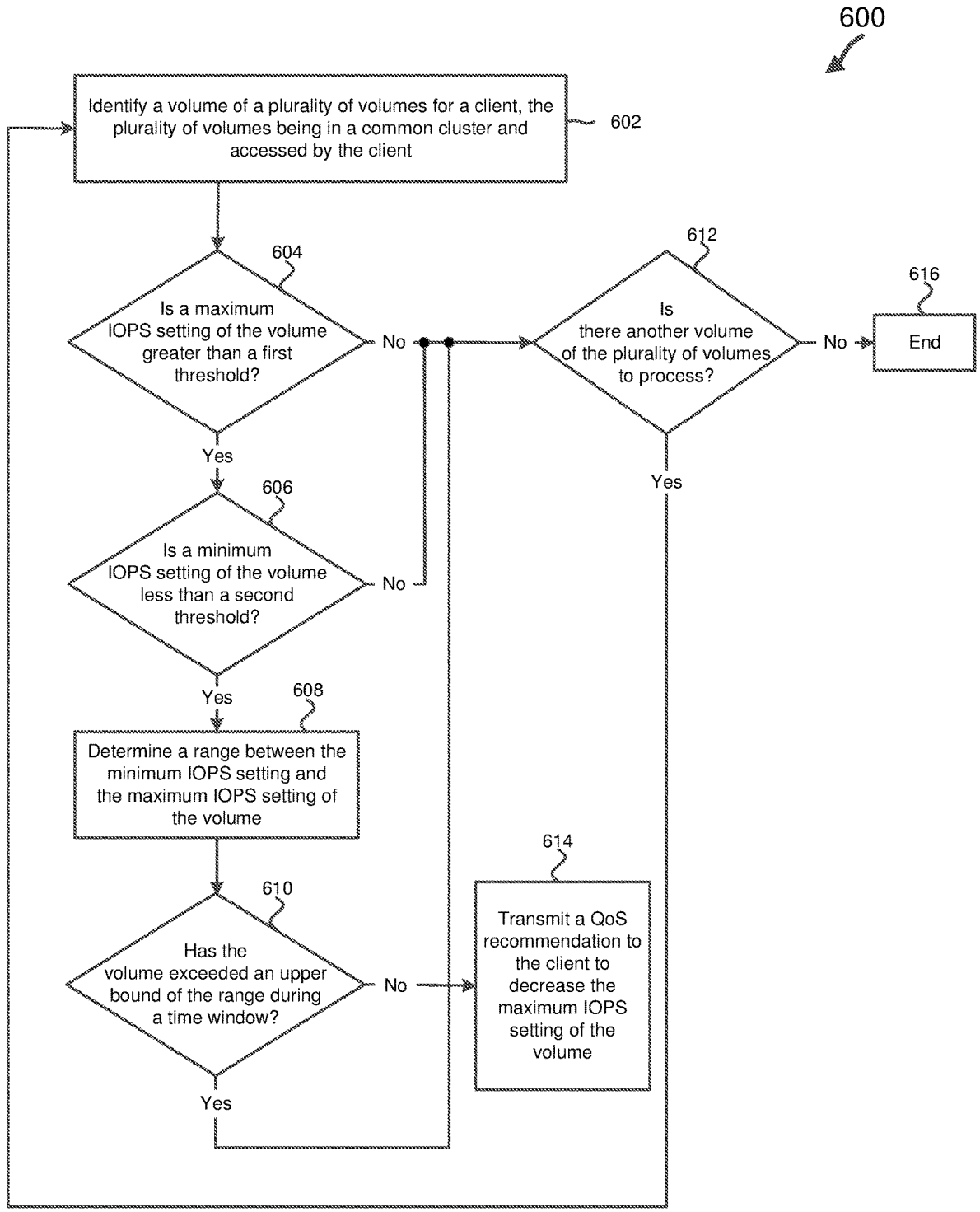
FIG. 6 illustrates a flow diagram of a method of providing an IOPS setting recommendation to decrease a maximum IOPS setting of a volume according to one or more aspects of the present disclosure.

FIG. 6 illustrates a flow diagram of a method 600 of providing an IOPS setting recommendation to decrease a maximum IOPS setting of a volume according to one or more aspects of the present disclosure. Blocks of the method 600 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 600. As illustrated, the method 600 includes a number of enumerated blocks, but embodiments of the method 600 may include additional blocks before, after, and in between the enumerated blocks. In some embodiments, one or more of the enumerated blocks may be omitted or performed in a different order.

At block 602, the method 600 includes identifying a volume of a plurality of volumes for a client, the plurality of volumes being in a common cluster and accessed by the client. In an example, the decrease IOPS module 228 may identify the volume.

At block 604, the method 600 includes determining whether a maximum IOPS setting of the volume is greater than a first threshold. In an example, the first threshold is 25,000 IOPS (as just one example of a numeric value), and the decrease IOPS module 228 may determine whether the maximum IOPS setting of the volume is greater than the first threshold of 25,000 IOPS. If the maximum IOPS setting of the volume is not greater than the first threshold, the method 600 may proceed to block 612. In contrast, if the maximum IOPS setting of the volume is greater than the first threshold, the method 600 may proceed to block 606.

At block 606, the method 600 includes determining whether a minimum IOPS setting of the volume is less than a second threshold. In an example, the second threshold is 1,000 IOPS (as just one example of a numeric value), and the decrease IOPS module 228 may determine whether the minimum IOPS setting of the volume is greater than the second threshold of 1,000 IOPS. If the minimum IOPS setting of the volume is not less than the second threshold, the method 600 may proceed to block 612. In contrast, if the minimum IOPS setting of the volume is less than the second threshold, the method 600 may proceed to block 608.

At block 608, the method 600 includes determining a range between the minimum IOPS setting and the maximum IOPS setting of the volume. In an example, the decrease IOPS module 228 may determine a minimum-to-maximum range between the minimum IOPS setting and the maximum IOPS setting. At block 610, the method 600 includes determining whether the volume has exceeded an upper bound of the range (e.g., minimum-to-maximum range) during the time window.

In relation to blocks 608 and 610 and using the above example in FIG. 5 (for purposes of illustration only) in which the minimum IOPS setting is set to 1,000 IOPS and the maximum IOPS setting is set to 25,000 IOPS, the decrease IOPS module 228 may determine that the range in block 608 is 1,000 IOPS to 25,000 IOPS. The decrease IOPS module 228 may determine the upper bound, which may be a number or a percentage of the distribution of minimum-to-maximum data. In keeping with the above example in which the minimum-to-maximum range is partitioned into quintiles, the upper bound may be 10,600 IOPS and accordingly include observations in which the volume is operating at 10,600 to 25,000 IOPS or may be the third quintile of the minimum-to-maximum range and may accordingly include observations in which the volume is operating at the third, fourth, or fifth quintile of the minimum-to-maximum range.

If the volume has exceeded the upper bound of the range between the minimum IOPS setting and the maximum IOPS setting during the time window, then the volume may be operating closer to the maximum IOPS setting and it may be likely that the volume will operate at least at or beyond the maximum IOPS setting. Accordingly, it may be undesirable to decrease the maximum IOPS setting of the volume. In this instance, the method 600 may proceed to block 612.

In contrast, if the volume has not exceeded the upper bound of the range between the minimum IOPS setting and the maximum IOPS setting during the time window, then the volume may be operating well below the maximum IOPS setting and it may be desirable to decrease the maximum IOPS setting of the volume. In this example, all observations in which the volume is operating within the time window falls within the first or second minimum-to-maximum sub-ranges. If the volume has not exceeded the upper bound of the range between the minimum IOPS setting and the maximum IOPS setting during the time window, the method 600 may proceed to block 614.

At block 614, the method 600 includes transmitting a QoS recommendation to the client to decrease the maximum IOPS setting of the volume. In an example, the decrease IOPS module 228 may trigger transmission of the QoS recommendation in response to determining that the maximum IOPS setting of the volume is greater than the first threshold, in response to determining that the minimum IOPS setting of the volume is less than the second threshold, and in response to determining that the volume has not exceeded an upper bound of a range between the minimum and maximum IOPS settings. In some examples, the QoS module 220 may automatically decrease the maximum IOPS setting of the volume based on these determinations.

The recommendation module 230 may transmit the QoS recommendation to the client to decrease the maximum IOPS setting of the volume. In some examples, the QoS module 220 may receive a request from the client 214 to decrease the maximum IOPS setting of the volume in accordance with the QoS recommendation, and may perform the update based on the client's request. In some examples, the QoS recommendation may include a recommendation to the client to restore the default setting of the maximum IOPS setting if the default setting is less than the current maximum IOPS setting of the volume. Additionally or alternatively, the QoS module 220 may restore the default setting of the maximum IOPS setting of the volume if the default setting is less than the current maximum IOPS setting of the volume. In some examples, the QoS recommendation may include a recommendation to the client to set the maximum IOPS setting to an IOPS value below the upper bound of the range between the minimum IOPS setting and the maximum IOPS setting. Additionally or alternatively, the QoS module 220 may automatically update the maximum IOPS setting of the volume to the IOPS value.

In some examples, the QoS module 220 may automatically decrease the maximum IOPS setting of the volume in accordance with block 614. For example, the QoS module 220 may decrease the maximum IOPS setting automatically if the adjustment value is within a first threshold, but request approval from a user if the adjustment value is within a second threshold. In an example, the first threshold may be less than the second threshold. The latter change with regard to the second threshold may have a bigger impact on other volumes in the cluster. In another example, the first threshold may be greater than the second threshold.

At block 612, the method 600 includes determining whether there is another volume of the plurality of volumes to process. If there is another volume of the plurality of volumes to process, the method 600 may proceed back to block 602, during which another volume is processed as discussed relative to FIG. 6. If there is not another volume of the plurality of volumes to process, the method 600 may proceed to block 616. At block 616, the method 600 ends.

The QoS module 220 may execute the method 600 based on various mechanisms. For example, the QoS module 220 may execute the method 600 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 600 for one or more clients. The QoS module 220 may execute any of the methods 300, 400, 500, 700, 800, 900, and/or 1000 in FIGS. 3, 4, 5, 7, 8, 9, and/or 10, respectively, before, after, or during execution of the method 600.

In some other examples, if the minimum IOPS setting of a volume is set too low (e.g., the volume typically processes more IOPS operations than the minimum IOPS setting), then the volume may be starved of IOPS for workloads running on the volume. In such examples, it may be desirable to increase the minimum IOPS setting of the volume.

Figure 7:
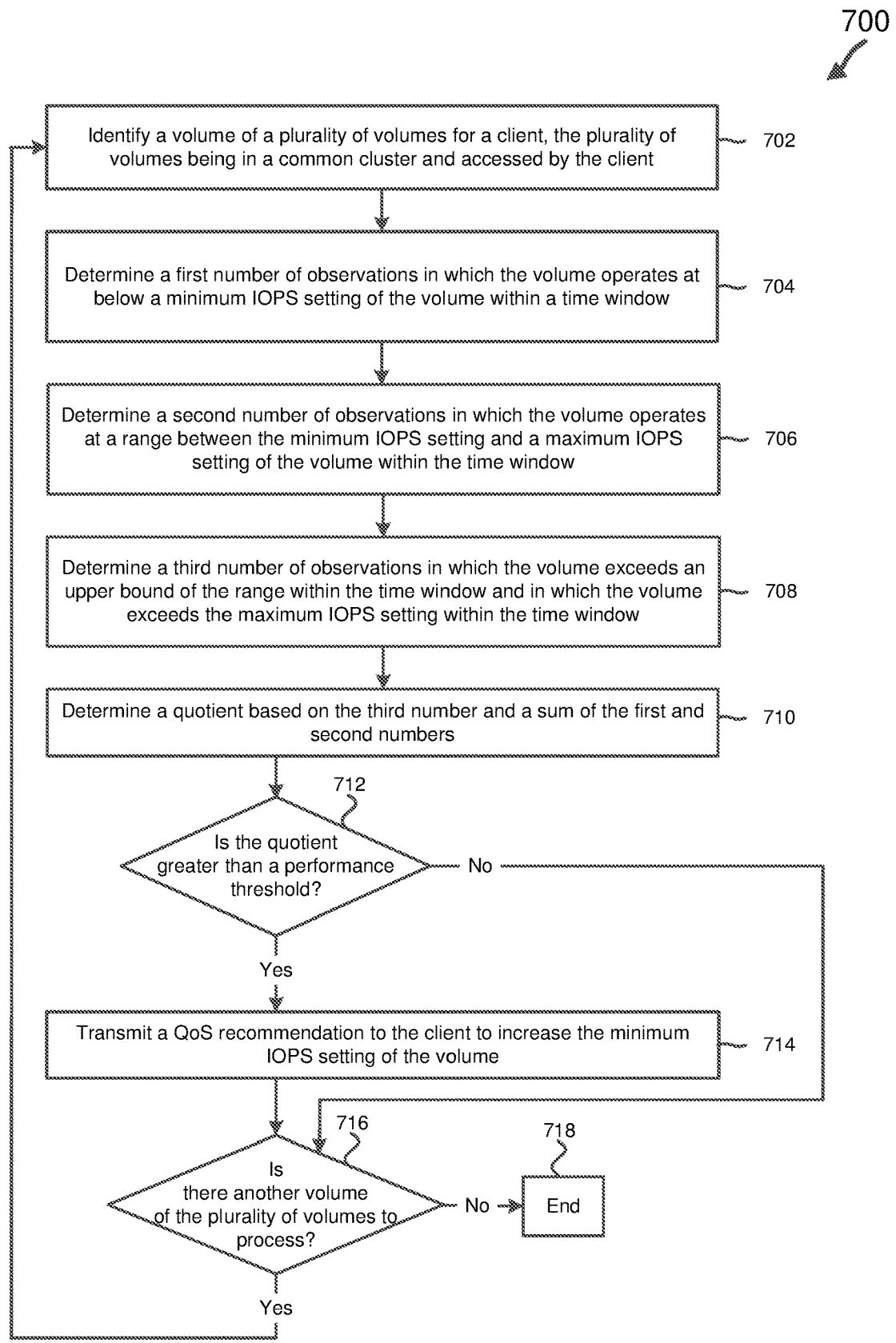
FIG. 7 illustrates a flow diagram of a method of providing a QoS recommendation to increase a minimum IOPS setting of a volume according to one or more aspects of the present disclosure.

FIG. 7 illustrates a flow diagram of a method 700 of providing a QoS recommendation to increase a minimum IOPS setting of a volume according to one or more aspects of the present disclosure. Blocks of the method 700 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 700. As illustrated, the method 700 includes a number of enumerated blocks, but embodiments of the method 700 may include additional blocks before, after, and in between the enumerated blocks. In some embodiments, one or more of the enumerated blocks may be omitted or performed in a different order.

At block 702, the method 700 includes identifying a volume of a plurality of volumes for a client, the plurality of volumes being in a common cluster and accessed by the client. In an example, the increase IOPS module 226 may identify the volume.

At block 704, the method 700 includes determining a first number of observations in which the volume operates at below a minimum IOPS setting of the volume within a time window. In an example, the increase IOPS module 226 may determine a first QoS metric including the first QoS metric. In some examples, if the minimum IOPS setting is set to 1,000 IOPS (for purposes of illustration only), then the first number of observations may include a count of the amount of time in which the volume is operating at below 1,000 IOPS within the time window.

At block 706, the method 700 includes determining a second number of observations in which the volume operates at a range between the minimum IOPS setting and a maximum IOPS setting of the volume within the time window. In an example, the increase IOPS module 226 may determine a second QoS metric including the second QoS metric. In some examples, if the minimum IOPS setting is set to 1,000 IOPS and the maximum IOPS setting is set to 25,000 IOPS (for purposes of illustration only), then the second number of observations may include a count of the amount of time in which the volume is operating between the range of 1,000 and 25,000 IOPS within the time window.

At block 708, the method 700 includes determining a third number of observations in which the volume exceeds an upper bound of the range (e.g., minimum-to-maximum range) within the time window and in which the volume has exceeds the maximum IOPS setting within the time window. Using the above example in FIG. 5 (for sake of illustration) in which the minimum IOPS setting is set to 1,000 IOPS and the maximum IOPS setting is set to 25,000 IOPS, the increase IOPS module 226 may determine that the range is 1,000 IOPS to 25,000 IOPS. The increase IOPS module 226 may determine the upper bound, which may be a number or a percentage of the distribution of minimum-to-maximum data. In keeping with the above example in which the minimum-to-maximum range is partitioned into quintiles, the upper bound may be 10,600 IOPS and may accordingly include a number of observations in which the volume is operating at 10,600 to 25,000 IOPS or may be the third quintile of the minimum-to-maximum range and accordingly include a number of observations in which the volume is operating at the third, fourth, and fifth quintile of the minimum-to-maximum range. Additionally, the volume exceeds the maximum IOPS setting if the volume is operating above 25,000 IOPS. In this example, the third number of observations may include a count of the amount of time in which the volume exceeds the upper bound of the range within the time window (e.g., operating between the range of 10,600 and 25,000 IOPS within the time window) and a count of the amount of time in which the volume exceeds the maximum IOPS setting within the time window.

At block 710, the method 700 includes determining a quotient based on the third number and a sum of the first and second numbers. The sum of the first and second numbers may represent the total number of observations in which the volume operates at below the minimum IOPS setting and in which the volume operates between the minimum IOPS setting and the maximum IOPS setting. In an example, the increase IOPS module 226 may determine the quotient by dividing the third number by a sum of the first and second numbers. The quotient may indicate a proportion of times in which the volume is operating at least at, for example, forty percent above the minimum IOPS setting of the volume.

At block 712, the method 700 includes determining whether the quotient is greater than a performance threshold. The increase IOPS module 226 may determine whether the quotient is greater than the performance threshold. In an example, the performance threshold is 0.5 and the increase IOPS module 226 may determine whether the volume is operating above the upper bound of the range (e.g., the volume is operating at least at forty percent above the minimum IOPS setting of the volume) for greater than fifty percent of the sum of the first and second number of observations.

If the quotient is not greater than the performance threshold, then the increase IOPS module 226 may determine that the volume does not process enough IOPS on a consistent basis to warrant an increase to the minimum IOPS setting of the volume. In this instance, the method 700 may proceed to block 716. In contrast, if the quotient is greater than the performance threshold, then the increase IOPS module 226 may determine that the volume processes enough IOPS on a consistent basis to warrant an increase to the minimum IOPS setting of the volume. For example, the increase IOPS module 226 may determine that if the minimum IOPS setting is not increased, the volume may exceed the minimum IOPS setting, potentially degrading performance. If the quotient is greater than the performance threshold, the method 700 may proceed to block 714.

At block 714, the method 700 includes transmitting a QoS recommendation to the client to increase the minimum IOPS setting of the volume. In an example, the increase IOPS module 226 may trigger transmission of the QoS recommendation in response to determining that the quotient is greater than the performance threshold, the quotient being based on a first number of observations in which the volume operates at below the minimum IOPS setting of the volume within a time window, a second number of observations in which the volume operates within a range between the minimum IOPS setting and the maximum IOPS setting of the volume within the time window, and a third number of observations in which the volume has exceeded an upper bound of the range within the time window and in which the volume has exceeded the maximum IOPS setting within the time window. In some examples, the QoS module 220 may automatically increase the minimum IOPS setting of the volume based on these determinations.

The recommendation module 230 may transmit the QoS recommendation to the client to increase the minimum IOPS setting of the volume. In some examples, the QoS module 220 may receive a request from the client 214 to increase the minimum IOPS setting of the volume in accordance with the QoS recommendation may perform the update based on the client's request. In some examples, the QoS recommendation may include a recommendation to the client to restore the default setting of the minimum IOPS setting if the default setting is greater than the current minimum IOPS setting of the volume. Additionally or alternatively, the QoS module 220 may automatically restore the default setting of the minimum IOPS setting of the volume if the default setting is greater than the current minimum IOPS setting of the volume. In some examples, the QoS recommendation may include a recommendation to the client to set the minimum IOPS setting to an IOPS value above the upper bound of the range between the minimum IOPS setting and the maximum IOPS setting. Additionally or alternatively, the QoS module 220 may automatically update the maximum IOPS setting of the volume to an IOPS value above the upper bound of the range between the minimum IOPS setting and the maximum IOPS setting.

In some examples, the QoS module 220 may automatically increase the minimum IOPS setting of the volume in accordance with the block 714. For example, the QoS module 220 may increase the minimum IOPS setting automatically if the adjustment value is within a first threshold, but request approval from a user if the adjustment value is within a second threshold. In an example, the first threshold may be less than the second threshold. The latter change with regard to the second threshold may have a bigger impact on other volumes in the cluster. In another example, the first threshold may be greater than the second threshold.

At block 716, the method 700 includes determining whether there is another volume of the plurality of volumes to process. If there is another volume of the plurality of volumes to process, the method 700 may proceed back to block 702, during which another volume is processed as discussed relative to FIG. 7. If there is not another volume of the plurality of volumes to process, the method 700 may proceed to block 718. At block 718, the method 700 ends.

The QoS module 220 may execute the method 700 based on various mechanisms. For example, the QoS module 220 may execute the method 700 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 700 for one or more clients. The QoS module 220 may execute any of the methods 300, 400, 500, 600, 800, 900, and/or 1000 in FIGS. 3, 4, 5, 6, 8, 9, and/or 10, respectively, before, after, or during execution of the method 700.

In some other examples, if the maximum IOPS setting of a volume is set too low (e.g., the volume typically processes more IOPS operations than the maximum IOPS setting) and the volume's workload does not reach the burst IOPS setting assigned to the volume, then the volume may be throttled along with the volumes on that volume's slice service, resulting in degradation of performance for the entire slice service. In such examples, it may be desirable to increase the maximum IOPS setting of the volume.

Figure 8:
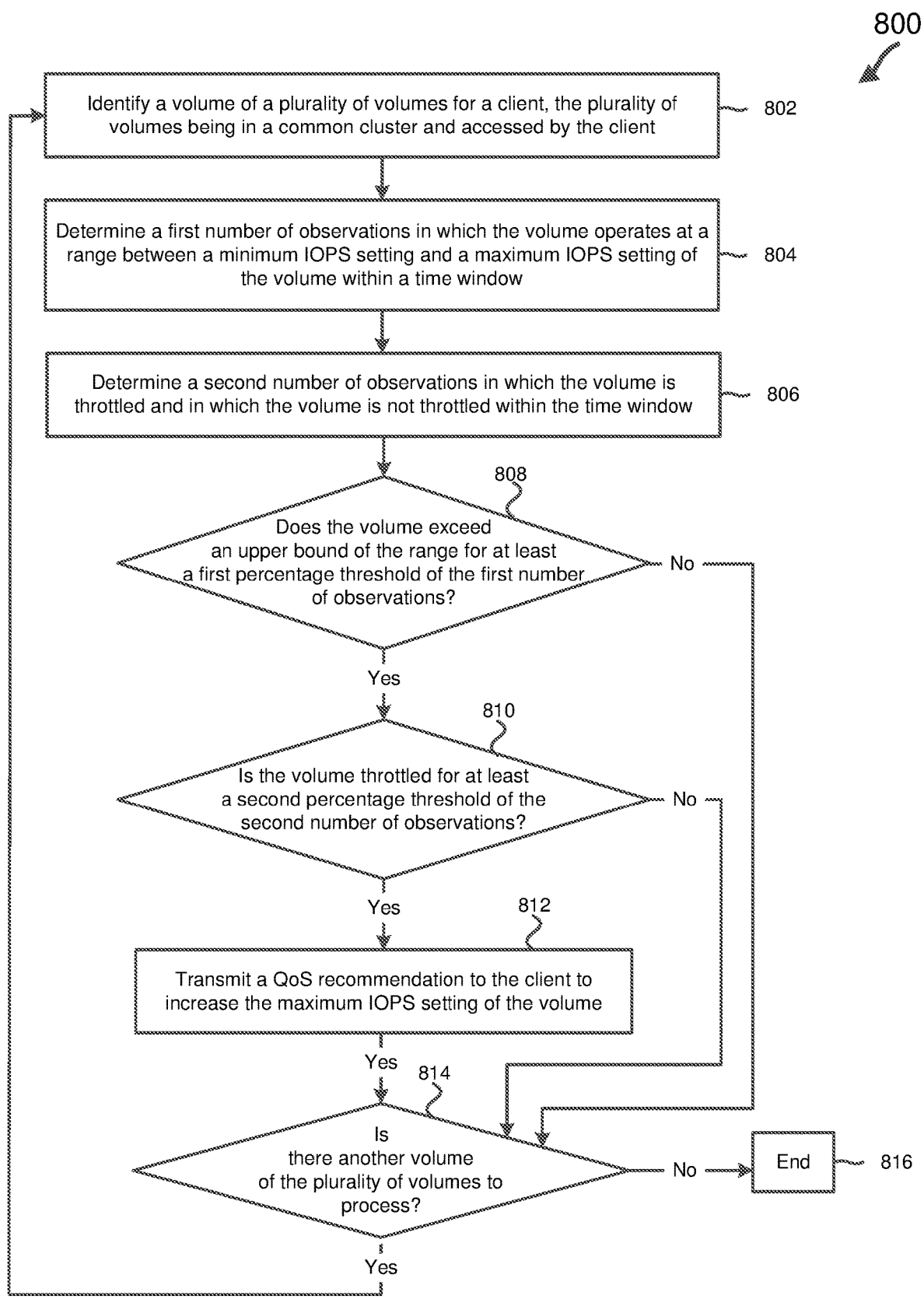
FIG. 8 illustrates a flow diagram of a method of providing a QoS recommendation to increase a maximum IOPS setting of a volume according to one or more aspects of the present disclosure.

FIG. 8 illustrates a flow diagram of a method 800 of providing a QoS recommendation to increase a maximum IOPS setting of a volume according to one or more aspects of the present disclosure. Blocks of the method 800 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 800. As illustrated, the method 800 includes a number of enumerated blocks, but embodiments of the method 800 may include additional blocks before, after, and in between the enumerated blocks. In some embodiments, one or more of the enumerated blocks may be omitted or performed in a different order.

At block 802, the method 800 includes identifying a volume of a plurality of volumes for a client, the plurality of volumes being in a common cluster and accessed by the client. In an example, the increase IOPS module 226 may identify the volume.

At block 804, the method 800 includes determining a first number of observations in which the volume operates at a range between a minimum IOPS setting and a maximum IOPS setting of the volume within a time window. In an example, the increase IOPS module 226 may determine the first number of observations. Using the above example (by way of illustration only) in which the minimum IOPS setting may be set to 1,000 IOPS and the maximum IOPS setting may be set to 25,000 IOPS, the increase IOPS module 226 may determine a minimum-to-maximum range between the minimum IOPS setting of 1,000 IOPS and the maximum IOPS setting of 25,000 IOPS.

As discussed above, if the minimum-to-maximum range is partitioned into five minimum-to-maximum subranges, with each minimum-to-maximum subrange covering twenty percent, then the increase IOPS module 226 may determine a first minimum-to-maximum subrange including 1,000 to 5,799 IOPS (e.g., first quintile), a second minimum-to-maximum subrange including 5,800 to 10,599 IOPS (e.g., second quintile), a third minimum-to-maximum subrange including 10,600 to 15,399 IOPS (e.g., third quintile), a fourth minimum-to-maximum subrange including 15,400 to 20,199 IOPS (e.g., fourth quintile), and a fifth minimum-to-maximum subrange including 20,200 to 25,000 IOPS (e.g., fifth quintile). The first number of observations may be a total number of observations in which the volume operates between 1,000 IOPS and 25,000 IOPS.

At block 806, the method 800 includes determining a second number of observations in which the volume is throttled and in which the volume is not throttled within the time window. The increase IOPS module 226 may determine the second number of observations.

At block 808, the method 800 includes determining whether the volume exceeds an upper bound of the range for at least a first percentage threshold of the first number of observations. The increase IOPS module 226 may determine whether the volume exceeds the upper bound of the range for at least the first percentage threshold of the first number of observations. The increase IOPS module 226 may determine the upper bound, which may be a number or a percentage of the distribution of minimum-to-maximum data. In keeping with the above example in which the minimum-to-maximum range is partitioned into quintiles, the upper bound may be 20,200 IOPS and accordingly include observations in which the volume is operating above 20,200 IOPS to 25,000 IOPS or may be the fifth quintile of the minimum-to-maximum range and may accordingly include observations in which the volume is operating at the fifth quintile of the minimum-to-maximum range. In an example, the first percentage threshold is twenty percent, and the increase IOPS module 226 may determine whether the volume falls between 20,200 and 25,000 IOPS for at least twenty percent of the first number of observations within the time window.

If the volume does not exceed the upper bound of the range for at least the first percentage threshold of the first number of observations, then the volume may not be operating close enough to the maximum IOPS setting for a sufficient amount of time and it may be unlikely that volume will operate beyond the maximum IOPS setting. Accordingly, it may be undesirable to increase the maximum IOPS setting of the volume. In this instance, the method 800 may proceed to block 814.

In contrast, if the volume exceeds the upper bound of the range for at least the first percentage threshold of the first number of observations, then the volume may be operating close enough to the maximum IOPS setting for a sufficient amount of time and it may be likely that volume will operate beyond the maximum IOPS setting. Accordingly, it may be desirable to increase the maximum IOPS setting of the volume. In this instance, the method 800 may proceed to block 810.

At block 810, the method 800 includes determining whether the volume is throttled for at least a second percentage threshold of the second number of observations. For example, the increase IOPS module 226 may determine whether the volume is throttled for at least the percentage threshold of the second number of observations. In an example, the second percentage threshold is fifty percent, and the increase IOPS module 226 may determine whether the volume is throttled for at least fifty percent of the second number of observations.

If the volume is not throttled for at least the second percentage threshold of the second number of observations, then the volume may not be operating above the maximum IOPS setting beyond the burst IOPS setting for a sufficient amount of time. Accordingly, it may be undesirable to increase the maximum IOPS setting of the volume. In this instance, the method 800 may proceed to block 814. In contrast, if the volume is throttled for at least the second percentage threshold of the second number of observations, then the volume may experience enough throttling to degrade system performance. Accordingly, it may be desirable to increase the maximum IOPS setting of the volume. In this instance, the method 800 may proceed to block 812.

At block 812, the method 800 includes transmitting a QoS recommendation to the client to increase the maximum IOPS setting of the volume. In an example, the increase IOPS module 226 may trigger transmission of the QoS recommendation in response to determining that the volume exceeds the upper bound of the range for at least a first percentage threshold of the first number of observations and in response to determining that the volume is throttled for at least a second percentage threshold of the second number of observations. In some examples, the QoS module 220 may automatically increase the maximum IOPS setting of the volume based on these determinations.

The recommendation module 230 may transmit the QoS recommendation to the client to increase the maximum IOPS setting of the volume. In some examples, the QoS module 220 may receive a request from the client 214 to increase the maximum IOPS setting of the volume in accordance with the QoS recommendation may perform the update based on the client's request. In some examples, the QoS recommendation may include a recommendation to the client to restore the default setting of the maximum IOPS setting if the default setting is greater than the current maximum IOPS setting of the volume. Additionally or alternatively, the QoS module 220 may automatically restore the default setting of the maximum IOPS setting of the volume if the default setting is greater than the current maximum IOPS setting of the volume. In some examples, the QoS recommendation may include a recommendation to the client to set the maximum IOPS setting to an IOPS value above the upper bound of the range between the minimum IOPS setting and the maximum IOPS setting. Additionally or alternatively, the QoS module 220 may automatically update the maximum IOPS setting of the volume to an IOPS value above the upper bound of the range between the minimum IOPS setting and the maximum IOPS setting.

In some examples, the QoS module 220 may automatically increase the maximum IOPS setting of the volume in accordance with the block 812. For example, the QoS module 220 may increase the maximum IOPS setting automatically if the adjustment value is within a first threshold, but request approval from a user if the adjustment value is within a second threshold. In an example, the first threshold may be less than the second threshold. The latter change with regard to the second threshold may have a bigger impact on other volumes in the cluster. In another example, the first threshold may be greater than the second threshold.

At block 814, the method 800 includes determining whether there is another volume of the plurality of volumes to process. If there is another volume of the plurality of volumes to process, the method 800 may proceed back to block 802, during which another volume is processed as discussed relative to FIG. 8. If there is not another volume of the plurality of volumes to process, the method 800 may proceed to block 816. At block 816, the method 800 ends.

The QoS module 220 may execute the method 800 based on various mechanisms. For example, the QoS module 220 may execute the method 800 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 800 for one or more clients. The QoS module 220 may execute any of the methods 300, 400, 500, 600, 700, 900, and/or 1000 in FIGS. 3, 4, 5, 6, 7, 9, and/or 10, respectively, before, after, or during execution of the method 800.

Figure 9:
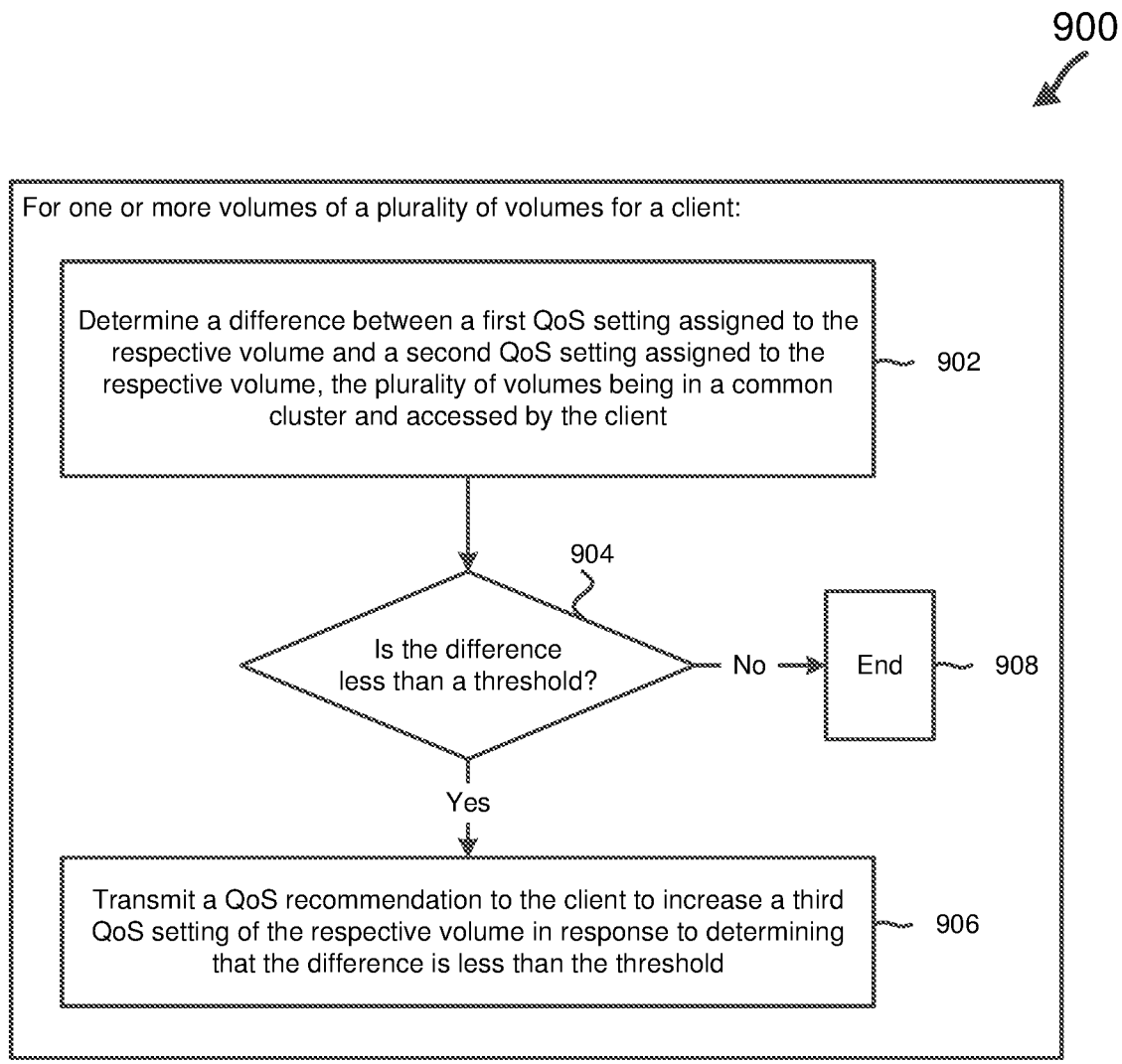
FIG. 9 illustrates a flow diagram of a method of providing a QoS recommendation to increase a QoS setting according to one or more aspects of the present disclosure.

FIG. 9 illustrates a flow diagram of a method 900 of providing a QoS recommendation to increase a QoS setting according to one or more aspects of the present disclosure. Blocks of the method 900 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 900. As illustrated, the method 900 includes a number of enumerated blocks, but embodiments of the method 900 may include additional blocks before, after, and in between the enumerated blocks. In some embodiments, one or more of the enumerated blocks may be omitted or performed in a different order.

In FIG. 9, for one or more volumes of a plurality of volumes for a client (whether all volumes or a subset of all volumes for a client), the QoS module 220 may execute blocks 902, 904, 906, and/or 908. At block 902, the method 900 includes determining a difference between a first QoS setting assigned to the respective volume and a second QoS setting assigned to the respective volume, the plurality of volumes being in a common cluster and accessed by the client. In an example, the difference module 224 may determine the difference between the first and second QoS settings. The difference module 224 may execute block 902, for example, periodically (e.g., once a week) or upon request by a client. For each volume used by the client, the client may set the first and/or second QoS settings of the respective volume. At a later point in time, the client may change the first and/or second QoS settings of the volume.

At block 904, the method 900 includes determining whether the difference is less than a threshold. In an example, the threshold is fifty IOPS (as just one example of a numeric value), and the difference module 224 may determine whether the difference between the first and second QoS settings is less than the threshold of fifty IOPS. The larger the difference, the larger the range between the first and second QoS settings. The smaller the difference, the smaller the range between the first and second QoS settings.

If the difference between the first and second QoS settings is less than the threshold, the method 900 may proceed to block 906. At block 906, the method 900 includes transmitting a QoS recommendation to the client to increase a third QoS setting of the respective volume in response to determining that the difference is less than the threshold. The first QoS setting may be the same as or different from the first and/or second QoS setting. The QoS module 220 may receive a request from the client to update the third QoS setting of the volume in accordance with the QoS recommendation.

In contrast, if the difference between the first and second QoS settings is not less than the threshold, the method 900 may proceed to block 908. At block 908, the method 900 ends. If the difference between the first and second QoS settings is not less than the threshold, then the difference module 224 does not trigger the recommendation module 230 to transmit a recommendation to the client 214 to increase the third QoS setting of the volume. At a later point in time, the first QoS setting and/or the second QoS setting may change, causing the recommendation module 230 to transmit the QoS recommendation the next time the method 900 is executed.

FIG. 3 may correspond to aspects of FIG. 9. In some examples, the first QoS setting is the maximum IOPS setting of the volume, and the second QoS setting is the minimum IOPS setting of the volume. The difference module 224 may determine whether a difference between the minimum IOPS setting and the maximum IOPS setting of the volume is less than a threshold. If the difference is less than the threshold, the difference module 224 may trigger the recommendation module 230 to transmit a QoS recommendation to the client to increase a burst IOPS setting of the volume. It may be desirable to increase a value of the burst IOPS setting of the volume to allow the volume to perform beyond its regular maximum IOPS setting for a longer period of time than would have otherwise been allowed with a non-adjusted burst IOPS setting.

FIG. 4 may correspond to aspects of FIG. 9. In some examples, the first QoS setting is the burst IOPS setting of the volume, and the second QoS setting is the maximum IOPS setting of the volume. In some examples, it may be desirable to increase a value of the burst IOPS setting of the volume to allow the volume to perform beyond its regular maximum IOPS setting for a longer period of time than would have otherwise been allowed with a non-adjusted burst IOPS setting. The difference module 224 may determine whether a difference between the burst IOPS setting and the maximum IOPS setting of the volume is less than a threshold. If the difference is less than the threshold, the difference module 224 may trigger the recommendation module 230 to transmit a QoS recommendation to the client to increase the burst IOPS setting of the volume.

The QoS module 220 may execute the method 900 based on various mechanisms. For example, the QoS module 220 may execute the method 900 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 900 for one or more clients.

Figure 10:
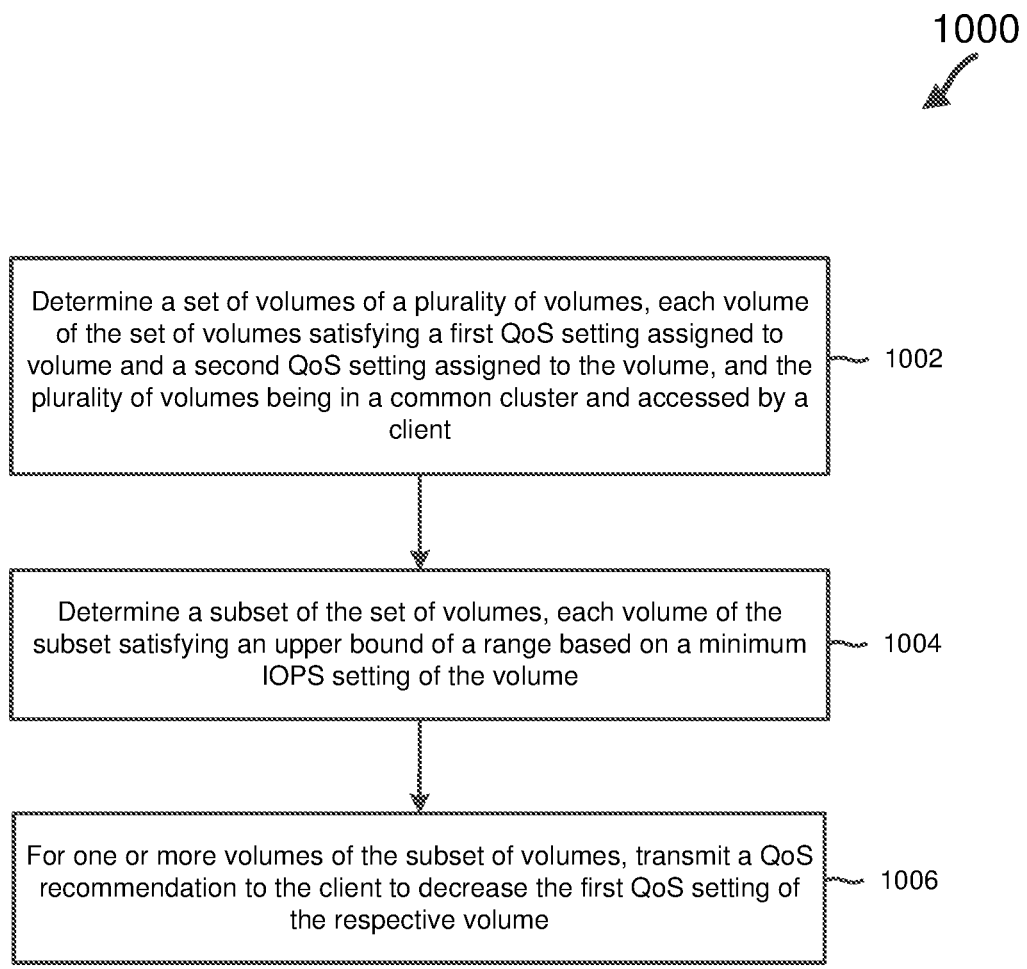
FIG. 10 illustrates a flow diagram of a method of providing a QoS recommendation to increase an IOPS setting of a volume according to one or more aspects of the present disclosure.

FIG. 10 illustrates a flow diagram of a method 1000 of providing a QoS recommendation to decrease an IOPS setting of a volume according to one or more aspects of the present disclosure. Blocks of the method 1000 can be executed by a computing device (e.g., a processor, processing circuit, and/or other suitable component, such as of a storage node 203). For example, the QoS module 220 may utilize one or more components, such as the data collector 222, the difference module 224, the increase IOPS module 226, the decrease IOPS module 228, and/or the recommendation module 230, to execute the blocks of method 1000. As illustrated, the method 1000 includes a number of enumerated blocks, but embodiments of the method 1000 may include additional blocks before, after, and in between the enumerated blocks. In some embodiments, one or more of the enumerated blocks may be omitted or performed in a different order.

In FIG. 10, at block 1002, the method 1000 includes determining a set of volumes of a plurality of volumes, each volume of the set of volumes satisfying a first QoS setting assigned to volume and a second QoS setting assigned to the volume, and the plurality of volumes being in a common cluster and accessed by a client. In an example, the decrease IOPS module 228 may determine the set of volumes of the plurality of volumes. At block 1004, the method 1000 includes determining a subset of the set of volumes, each volume of the subset satisfying an upper bound of a range based on a minimum IOPS setting of the volume. At block 1006, the method 1000 includes for one or more volumes of the subset of volumes, transmitting a QoS recommendation to the client to decrease the first QoS setting of the respective volume. The QoS module 220 may receive a request from the client to increase the first QoS setting of the volume in accordance with the QoS recommendation and the QoS module 220 may update the first QoS setting based on the client's request.

FIG. 5 may correspond to aspects of FIG. 10. In some examples, the first QoS setting is the minimum IOPS setting of the volume, and the second QoS setting is the maximum IOPS setting of the volume. For example, in relation to the block 504 in FIG. 5 and block 1002 in FIG. 10, a volume may satisfy the first QoS setting and the second QoS setting if the volume has not exceeded the minimum IOPS setting of the volume within a time window and has not exceeded the maximum IOPS setting of the volume within the time window. In relation to the block 506 in FIG. 5 and block 1004 in FIG. 10, a volume of the subset may satisfy an upper bound of a range based on the minimum IOPS setting if the volume does not exceed the upper bound of a range between zero and the minimum IOPS setting during the time window. For example, a subset of the volumes may be determined, where each volume of the subset does not exceed an upper bound of a below-minimum during the time window. In relation to the block 512 in FIG. 5 and block 1006 in FIG. 10, for one or more volumes, a QoS recommendation to the client to decrease the minimum IOPS setting of the respective volume may be transmitted.

FIG. 6 may correspond to aspects of FIG. 10. In some examples, the first QoS setting is the maximum IOPS setting of the volume, and the second QoS setting is the minimum IOPS setting of the volume. For example, in relation to the blocks 604 and 606 in FIG. 6 and block 1002 in FIG. 10, a volume may satisfy the first QoS setting and the second QoS setting if the maximum IOPS setting of the volume is greater than a first threshold and the minimum IOPS setting of the volume is less than a second threshold. In relation to the block 610 in FIG. 6 and block 1004 in FIG. 10, a volume of the subset may satisfy an upper bound of a range based on the minimum IOPS setting if the volume does not exceed the upper bound of a range between the minimum IOPS setting and the maximum IOPS setting during the time window. For example, a subset of the volumes may be determined, where each volume of the subset does not exceed an upper bound of a minimum-to-maximum range during the time window. In relation to the block 614 in FIG. 6 and block 1006 in FIG. 10, for one or more volumes, a QoS recommendation to the client to decrease the maximum IOPS setting of the respective volume may be transmitted.

The QoS module 220 may execute the method 1000 based on various mechanisms. For example, the QoS module 220 may execute the method 1000 periodically (e.g., every week), based on a client request, based on detecting a potential performance degradation in the cluster, based on detecting that the client has created X volumes, and/or based on detecting that the client has deleted Y volumes, where X and Y are numbers greater than zero. Additionally, the QoS module 220 may execute the method 1000 for one or more clients.

The present embodiments can take the form of an entirely hardware embodiment, an entirely software embodiment, or an embodiment containing both hardware and software elements. Accordingly, it is understood that any operation of the computing systems of computing architecture 100, 200 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for providing a recommendation to the client to modify one or more QoS settings of one or more volumes in a distributed storage system. In some embodiments, the method includes for one or more volumes of a plurality of volumes (e.g., each or a subset of the plurality of volumes) for a client: determining a difference between a first quality of service (QoS) setting assigned to the respective volume and a second QoS setting assigned to the respective volume, the plurality of volumes being in a common cluster and accessed by a client; determining that the difference is less than a threshold; and transmitting a QoS recommendation to the client to increase a third QoS setting of the respective volume in response to determining that the difference is less than the threshold.

In yet further embodiments, the non-transitory machine-readable medium has instructions for performing a method of transmitting a QoS recommendation to a client to decrease a QoS setting of one or more volumes, including machine executable code which when executed by at least one machine, causes the machine to: determine a set of volumes of a plurality of volumes, each volume of the set of volumes satisfying a first QoS setting assigned to the volume and a second QoS setting assigned to the volume, and the plurality of volumes being in a common cluster and accessed by a client; determine a subset of the set of volumes, each volume of the subset satisfying an upper bound of a range based on the minimum IOPS setting of the volume; and for one or more volumes of the subset, transmit a QoS recommendation to the client to decrease the first QoS setting of the respective volume.

In yet further embodiments, a computing device includes a memory containing a machine-readable medium comprising machine executable code having stored thereon instructions for performing a method of transmitting a QoS recommendation to a client to increase a QoS setting of one or more volumes; and a processor coupled to the memory. The processor is configured to execute the machine executable code to: for each volume of a plurality of volumes for a client: determine a first number of observations in which the volume operates at below a minimum input/output operations per second (IOPS) setting of the volume within a time window; determine a number of observations in which the volume operates at a range between the minimum IOPS setting and a maximum IOPS setting of the volume within the time window; determine a third number of observations in which the volume exceeds an upper bound of the range within the time window and in which the volume exceeds the maximum IOPS setting within the time window; determine whether a quotient based on the first, second, and third numbers of observations is greater than a percentage threshold; and transmit a QoS recommendation to the client to increase the minimum IOPS setting of the respective volume in response to determining that the quotient is greater than the percentage threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a cluster storage system, the method comprising:
   providing a plurality of storage volumes to a plurality of clients on a storage node of the duster storage system;
   determining a difference between a first quality of service (QoS) setting assigned to a first storage volume and a second QoS setting assigned to the first storage volume, the first storage volume being accessed by a first client, wherein the first QoS setting and the second QoS setting specify input/output operations per second (IOPS) for the first storage volume;
   determining that the difference is less than a threshold;
   modifying a third QoS setting in response to determining that the difference is less than the threshold; and
   performing input/output operations at the storage node at one or more rates according to the first QoS setting, the second QoS setting, and the third QoS setting.

2. The method of claim 1, wherein modifying the third QoS setting comprises increasing the third QoS setting and wherein the third QoS setting is a burst input/output operations per second (IOPS) setting.

3. The method of claim 1, further comprising:
   making a determination that the first client has opted into allowing the third QoS setting to be modified automatically; and
   modifying, automatically, the third QoS setting in response to the determination.

4. The method of claim 1, wherein modifying the third QoS setting comprises modifying, automatically, the third QoS setting when an adjustment value for modifying the third QoS setting is less than an automatic adjustment threshold.

5. The method of claim 1, further comprising sending a request for approval from the first client when an adjustment value for modifying the third QoS setting is less than a client approval threshold, wherein modifying the third QoS setting comprises modifying the third QoS in response to receiving the approval from the first client.

6. The method of claim 1, wherein the first QoS setting is a maximum IOPS setting and the second QoS setting is a minimum IOPS setting.

7. The method of claim 1, wherein the first QoS setting is a burst IOPS setting and the second QoS setting is a maximum IOPS setting.

8. The method of claim 1, wherein the first QoS setting and the third QoS setting are the same.

9. The method of claim 1, wherein the threshold is fifty input/output operations per second (IOPS).

10. A non-transitory machine-readable medium containing instructions that, when executed by a storage node of a cluster storage system, cause the storage node to:
    provide a plurality of storage volumes in a common cluster for access by a client;
    determine that a maximum input/output operations per second (IOPS) setting of a first storage volume of the plurality of storage volumes is greater than a first threshold and that a minimum IOPS setting of the first storage volume is less than a second threshold;
    determine that the first storage volume has stayed below an upper bound of a range between the minimum IOPS setting and the maximum IOPS setting within a time window;
    decrease the maximum IOPS setting of the first storage volume based on the maximum IOPS setting being greater than the first threshold, the minimum IOPS being less than the second threshold, and the first storage volume staying below the upper bound of the range; and
    perform input/output operations at the storage node according to the maximum IOPS setting and the minimum IOPS setting.

11. The non-transitory machine-readable medium of claim 10, wherein the instructions, when executed by the storage node, cause the storage node to decrease, automatically, the maximum IOPS setting to a value between the maximum IOPS setting and the upper bound of the range.

12. The non-transitory machine-readable medium of claim 10, wherein the instructions, when executed by the storage node, cause the storage node to decrease the maximum IOPS setting by restoring a default setting of the maximum IOPS setting of the first storage volume if the default setting is less than a current value of the maximum IOPS setting.

13. The non-transitory machine-readable medium of claim 10, wherein the instructions, when executed by the storage node, cause the storage node to decrease, automatically, the maximum IOPS setting when an adjustment value for modifying the maximum IOPS setting is less than an automatic adjustment threshold.

14. The non-transitory machine-readable medium of claim 10, wherein the instructions, when executed by the storage node, cause the storage node to decrease, automatically, the maximum IOPS setting to a value below the upper bound of the range.

15. A storage node comprising:
    a memory containing a machine-readable medium comprising instructions for performing a method of increasing a QoS setting of a first storage volume; and
    a processor coupled to the memory, the processor configured to execute the instructions to:
       providing, a plurality of storage volumes to a plurality of clients on a storage node of a cluster storage system;
       determine a first number of observations in which a first storage volume of the plurality of storage volumes operates at below a minimum input/output operations per second (IOPS) setting of the first storage volume within a time window;
       determine a second number of observations in which the first storage volume operates within a range between the minimum IOPS setting and a maximum IOPS setting of the first storage volume within the time window;
       determine a third number of observations that includes a count of an amount of time that the first storage volume exceeds an upper bound of the range within the time window;
       determine whether a quotient based on the first, second, and third numbers of observations is greater than a performance threshold;
       increase the minimum IOPS setting of the first storage volume in response to determining that the quotient is greater than the performance threshold;
       perform input/output operations at the storage node according to the maximum IOPS setting and the minimum IOPS setting.

16. The storage node of claim 15, wherein the third number of observations further includes a count of an amount of time that the first storage volume exceeds the maximum IOPS setting within the time window.

17. The storage node of claim 15, wherein the processor is further configured to execute the instructions to compute the quotient by dividing the third number of observations by a sum of the first number of observations and the second number of observations and wherein the quotient indicates a proportion of times in which the first storage volume is operating at least a selected percentage above the minimum IOPS setting of the first storage volume.

18. The storage node of claim 15, wherein the processor is configured to execute the instructions to restore a default setting of the minimum IOPS setting of the first storage volume if the default setting is greater than a current value of the minimum IOPS setting.

19. The storage node of claim 15, wherein the processor is configured to execute the instructions to increase the minimum IOPS setting to a value above the upper bound of the range.

20. The storage node of claim 15, wherein the processor is configured to execute the instructions to determine the first number of observations, determine the second number of observations, determine the third number of observations, and determine whether the quotient based on the first, second, and third numbers of observations is greater than the performance threshold in response to at least one of receiving a client request, detecting that a client has created a first selected number of storage volumes, or detecting that the client has deleted a second selected number of storage volumes.

* * * * *